(12) United States Patent
Nishimura

(10) Patent No.: US 9,825,873 B2
(45) Date of Patent: Nov. 21, 2017

(54) TRAFFIC CONTROL APPARATUS, BUFFERING CONTROL METHOD AND PACKET RELAY APPARATUS

(71) Applicant: FUJITSU LIMITED, Kawasaki-shi, Kanagawa (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/476,183

(22) Filed: Sep. 3, 2014

(65) Prior Publication Data

US 2015/0078395 A1 Mar. 19, 2015

(30) Foreign Application Priority Data

Sep. 17, 2013 (JP) .................................. 2013-192147

(51) Int. Cl.
| | |
|---|---|
| H04L 12/873 | (2013.01) |
| H04L 12/823 | (2013.01) |
| H04L 12/867 | (2013.01) |
| H04L 12/875 | (2013.01) |

(52) U.S. Cl.
CPC .............. *H04L 47/32* (2013.01); *H04L 47/56* (2013.01); *H04L 47/629* (2013.01)

(58) Field of Classification Search
CPC ....... H04L 47/629; H04L 47/56; H04L 47/32; H04L 12/2613; H04L 12/569; H04L 45/38; H04L 47/10; H04L 47/125; H04L 47/22; H04L 47/225; H04L 47/24; H04L 47/50; H04L 47/62; H04L 47/621; H04L 47/622–47/6235; H04L 47/625; H04L 47/6255

See application file for complete search history.

(56) References Cited

U.S. PATENT DOCUMENTS

| | | | | |
|---|---|---|---|---|
| 6,405,258 | B1 * | 6/2002 | Erimli | H04L 29/06 370/235 |
| 7,215,637 | B1 * | 5/2007 | Ferguson | H04L 45/00 370/230.1 |
| 8,264,957 | B1 * | 9/2012 | Charny | H04L 47/26 370/230 |
| 2001/0033581 | A1 * | 10/2001 | Kawarai | H04L 12/5693 370/468 |

(Continued)

FOREIGN PATENT DOCUMENTS

| | | |
|---|---|---|
| JP | 2000-299686 | 10/2000 |
| JP | 2004-363901 | 12/2004 |

*Primary Examiner* — Charles C Jiang
*Assistant Examiner* — Rose Clark
(74) *Attorney, Agent, or Firm* — Fujitsu Patent Center

(57) ABSTRACT

A traffic control apparatus at which packets of a plurality of packet flows arrive includes a plurality of buffers corresponding to a plurality of times, a selector configured to read a packet accumulated in one of the plurality of buffers corresponding to a current time, and a scheduler configured to decide one of the plurality of buffers to accumulate a packet of each of the plurality of packet flows. The scheduler attempts, for each of the plurality of packet flows, accumulation of packets which are reached during a predetermined period under a condition that, as quantity of packets accumulated in the plurality of buffers is larger, the number of buffers into which packets can be accumulated becomes smaller after the predetermined period.

12 Claims, 24 Drawing Sheets

(56) References Cited

U.S. PATENT DOCUMENTS

| | | | |
|---|---|---|---|
| 2002/0071387 A1* | 6/2002 | Horiguchi | H04L 47/10 370/229 |
| 2003/0112755 A1* | 6/2003 | McDysan | H04L 12/24 370/230 |
| 2004/0062259 A1* | 4/2004 | Jeffries | H04L 47/10 370/412 |
| 2005/0149563 A1* | 7/2005 | Yong | H04L 47/10 |
| 2005/0177644 A1* | 8/2005 | Basso | H04L 12/5693 709/232 |
| 2006/0050690 A1* | 3/2006 | Epps | H04L 12/5693 370/359 |
| 2006/0092837 A1* | 5/2006 | Kwan | H04L 47/10 370/229 |
| 2006/0187945 A1* | 8/2006 | Andersen | H04L 12/5693 370/412 |
| 2007/0104102 A1* | 5/2007 | Opsasnick | H04L 47/10 370/230 |
| 2008/0186918 A1* | 8/2008 | Tinnakornsrisuphap | H04L 47/10 370/331 |
| 2011/0051604 A1* | 3/2011 | Nishimura | H04L 47/10 370/235 |
| 2012/0039173 A1* | 2/2012 | Danzig | H04L 12/2801 370/235.1 |
| 2012/0213078 A1* | 8/2012 | Kitada | H04L 47/17 370/236 |
| 2015/0023366 A1* | 1/2015 | Lai | H04L 47/6215 370/412 |

* cited by examiner (a) IN THE CASE WHERE SHAPING IS NOT PERFORMED IN SCHEDULER (b) IN THE CASE WHERE SHAPING TO 1/3 PERFORMED IN SCHEDULER

FIG. 11

FLOW INFORMATION TABLE 22

| FLOW ID | Byte/TR | NEXT TR | REMAIN-ING byte | LATEST ACCUMU-LATED byte | TR UPPER LIMIT THRESHOLD |
|---|---|---|---|---|---|
| 1 | 2500 | TR2 | 1100 | 3900 | +5 |
| 2 | 7500 | TR1 | 6000 | 1500 | +10 |
| 3 | 2000 | TR3 | 500 | 5500 | +3 |
| ... | ... | ... | ... | ... | ... |
| m | 6000 | TR1 | 6000 | 0 | +10 |

FIG. 12

FLOW INFORMATION TABLE (22A)

| FLOW ID | Byte/TR | NEXT TR | REMAIN-ING byte | LATEST ACCUMU-LATED byte | AVERAGE ACCUMU-LATED byte | TR UPPER LIMIT THRESHOLD |
|---|---|---|---|---|---|---|
| 1 | 2500 | TR2 | 1100 | 3900 | 2852 | +5 |
| 2 | 7500 | TR1 | 6000 | 1500 | 703 | +10 |
| 3 | 2000 | TR3 | 500 | 5500 | 6211 | +3 |
| ⋮ | ⋮ | ⋮ | ⋮ | ⋮ | ⋮ | ⋮ |
| m | 6000 | TR1 | 6000 | 0 | 180 | +10 |

FIG. 13

TR UPPER LIMIT THRESHOLD DETERMINATION TABLE (24A)

| ACCUMULATED BYTE AMOUNT | TR UPPER LIMIT THRESHOLD |
|---|---|
| 1000 OR SMALLR | +10 |
| 1000 TO 5000 | +5 |
| 5000 OR MORE | +2 |

FIG. 15

TR UPPER LIMIT THRESHOLD DETERMINING MATRIX TABLE

| ACCUMULATED BYTE \ byte/TR | LESS THAN 3000 | 3000~5000 | OVER 5000 |
|---|---|---|---|
| LESS THAN 1000 | +10 | +10 | +10 |
| 1000~5000 | +5 | +5 | +10 |
| 5000~10000 | +3 | +5 | +5 |
| OVER 10000 | +2 | +3 | +3 |

FLOW INFORMATION TABLE 22A

| FLOW ID | Byte/TR | NEXT TR | REMAIN-ING byte | LATEST ACCUMU-LATED byte | AVERAGE ACCUMU-LATED byte | TR UPPER LIMIT THRESHOLD |
|---|---|---|---|---|---|---|
| 1 | 2500 | TR6 | 1100 | 3900 | 2852 | +3 |
| 2 | 7500 | TR2 | 6000 | 1500 | 2908 | +7.3 |
| 3 | 3000 | TR3 | 500 | 5500 | 6211 | +3 |
| ‥ | ‥ | ‥ | ‥ | ‥ | ‥ | ‥ |
| m | 6000 | TR1 | 6000 | 0 | 180 | +10 |

FIG. 19

| TR | UPPER LIMIT [B] | CURRENT QUEUE LENGTH[B] | IN-READING FLAG |
|---|---|---|---|
| 1 | 12500 | 0 | 0 |
| 2 | 12500 | 13050 | 1 |
| 3 | 12500 | 9000 | 0 |
| 4 | 12500 | 5700 | 0 |
| 5 | 12500 | 3210 | 0 |
| ⋮ | ⋮ | ⋮ | ⋮ |
| 50 | 12500 | 0 | 0 |

TRAFFIC CONTROL APPARATUS, BUFFERING CONTROL METHOD AND PACKET RELAY APPARATUS

CROSS-REFERENCE TO RELATED APPLICATION

This application is based upon and claims the benefit of priority of the prior Japanese Patent Application No. 2013-192147, filed on Sep. 17, 2013, the entire contents of which are incorporated herein by reference.

FIELD

Disclosure relates to a traffic control apparatus, a buffering control method and a packet relay apparatus.

BACKGROUND

In general, a packet relay apparatus is provided with a plurality of interfaces, a switch connecting the interfaces and a control device in charge of controlling the packet relay apparatus. A packet received by a certain interface (an ingress-side interface) is transferred by the switch to an interface (an egress-side interface) corresponding to a destination of the packet and transmitted from the egress-side interface. The interface is provided with buffers (queues) each of which temporarily accumulates packets, a shaper and a scheduler. The shaper has a function of controlling (suppressing) the transmission rate of packets, for example, by adjusting readout intervals of packets to be read from the buffers for each packet flow. The scheduler has a function of determining the order and a readout time of the packets being read from the buffers.

The shaper and the scheduler are roughly categorized as an "output type" or an "input type" according to positions where the shaper and the scheduler are arranged relative to the buffers. In the case of the "output type", the shaper and the scheduler are arranged at a subsequent stage of the buffers. An arrived packet is once accumulated in a buffer and then read in accordance with shaping and scheduling algorithms. On the other hand, in the "input type", the shaper and the scheduler are arranged at a previous stage of the buffers. In the case of the "input type", after a readout time at which an arrived packet is read from a buffer is determined in accordance with the shaping and scheduling algorithms, the arrived packet is accumulated into a buffer corresponding to the readout time. Outputting of packets is performed by reading a cue of packets arranged in order of time, in accordance with readout times.

For more information, see Japanese Laid-open Patent Publication No. 2000-299686 and Japanese Laid-open Patent Publication No. 2004-363901.

SUMMARY

One of aspects of embodiments is a traffic control apparatus at which packets of a plurality of packet flows arrive. The traffic control apparatus includes:
a plurality of buffers corresponding to a plurality of times;
a selector configured to read a packet accumulated in one of the plurality of buffers corresponding to a current time; and
a scheduler configured to decide one of the plurality of buffers to accumulate a packet of each of the plurality of packet flows,
wherein the scheduler attempts, for each of the plurality of packet flows, accumulation of packets which are reached during a predetermined period under a condition that, as quantity of packets accumulated in the plurality of buffers is larger, the number of buffers into which packets can be accumulated becomes smaller after the predetermined period, and discards a packet when there is no buffer into which the packet can be accumulated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates a data structure example of a flow information table;

FIG. 12 illustrates a data structure example of a flow information table in the case where an average value of "quantities of accumulated bytes" is applied;

FIG. 13 illustrates a data structure example of a TR upper limit threshold decision table;

FIG. 15 illustrates a data structure example of a TR upper limit threshold decision matrix table;

FIG. 18 illustrates storage content of a flow information table in the second embodiment;

FIG. 19 illustrates storage content of a buffer state table managed by a buffer state management section in the second embodiment;

DESCRIPTION OF EMBODIMENTS

Traffic relayed by a packet relay apparatus may be classified in order to achieve quality of service (QoS). One of the classes is a best effort (BE) class. The BE class is a non-reservation-type class, and overbooking (excessive accommodation) is permitted therefor. The transmission rate of a BE-class flow can be increased so as to use all the empty band within a link band.

Therefore, when certain one flow, among multiple BE-class flows sent out to a certain output link, occurs alone, the flow can occupy the whole band of the output link. On the other hand, when multiple flows occur in parallel (congestion occurs), the band of the output link is shared among the multiple flows. As a result, the transmission rate of each flow is suppressed.

An object of one aspect of the embodiments is to provide a technique capable of enabling, for multiple BE-class flows, effective utilization of an output link band and assurance of fairness in band occupation among the flows at the time of congestion.

Embodiments will be described below with reference to drawings. Configurations of the embodiments are exemplifications, and the present invention is not limited to the configurations of the embodiments.

[Configuration of Packet Relay Apparatus]

Figure 1:
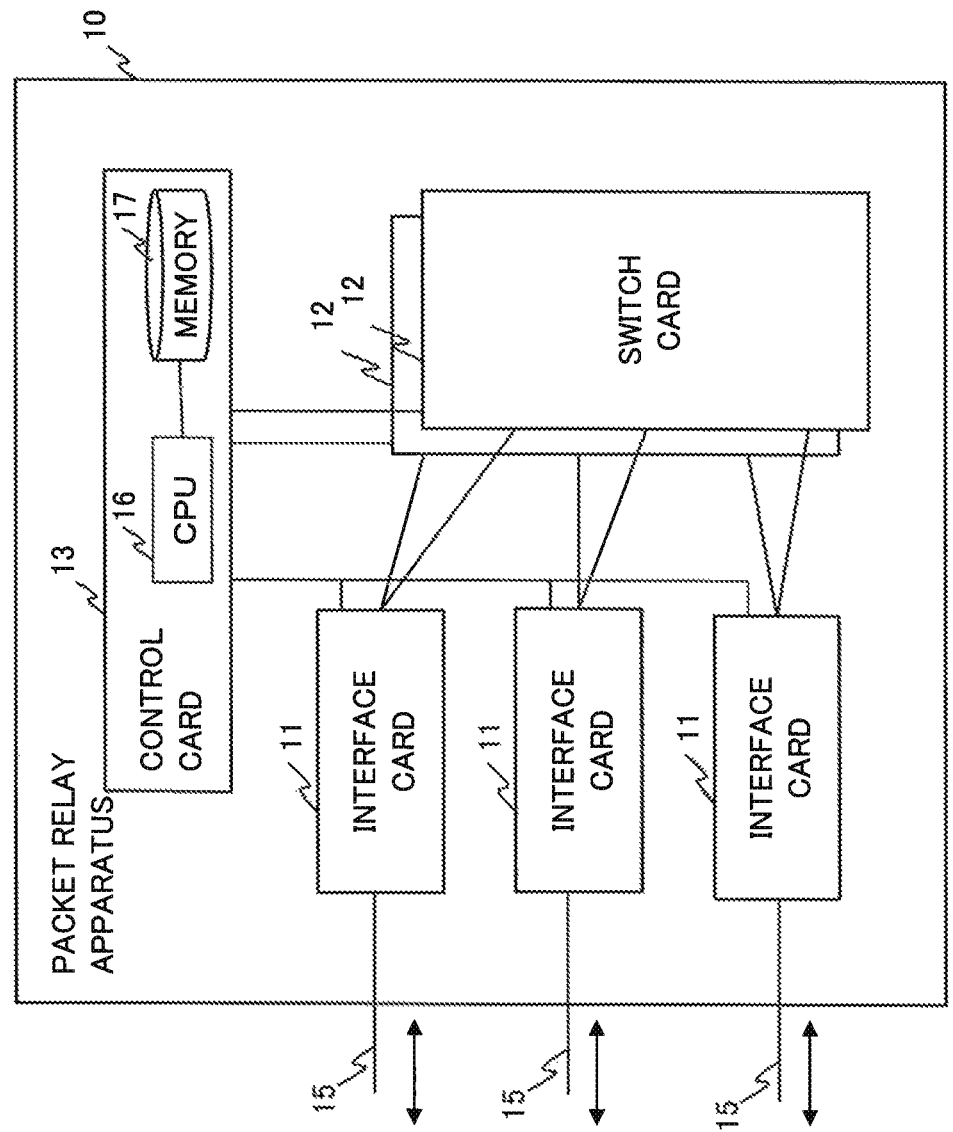
FIG. 1 illustrates a configuration example of a packet relay apparatus.

A configuration example of a packet relay apparatus applicable to the first and second embodiments described below will be described first. FIG. 1 illustrates the configuration example of the packet relay apparatus. The packet relay apparatus is, for example, a router (legacy router) or a layer 3 switch. FIG. 1 illustrates a configuration example of a packet relay apparatus of a chassis type (also referred to as a shelf type). The type of the packet relay apparatus, however, is not limited to the chassis type.

In the first and second embodiments, description will be made with a layer 3 packet (L3 switch) as an example. A traffic control method (scheduling and shaping method) according to the embodiments, however, is also applicable to a layer 2 switch having a plurality of buffers (queues) for a Media Access Control (MAC) frame. Therefore, the MAC frame corresponds to an example of "packet", and the layer 2 switch corresponds to an example of "packet relay apparatus".

In FIG. 1, a packet relay apparatus 10 includes a plurality of interface cards 11 mutually connected via an internal bus, one or more switch cards 12 (in FIG. 1, two are illustrated as an example), and a control card 13.

The interface card 11 is a card-type device having an interface performing input and output (transmission and reception) of data (user data and control data) and accommodates a physical link (for example, an optical fiber and/or a metal cable) 15 connected to another device. Though one physical link is illustrated in FIG. 1, one interface card 11 can accommodate a plurality of physical links. The switch card 12 is a card-type device which performs switching for data transfer among the interface cards 11.

The control card 13 is a card-type device which includes a central processing unit (CPU) 16 and a memory 17. The control card 13 performs control of the whole packet relay apparatus 10 by the CPU 16 executing a program stored in the memory 17. For example, the control card 13 performs exchange (transmitting and receiving) control information (control data) with other apparatuses and state management of the packet relay apparatus 10.

A packet reaches an ingress-side interface card 11 via a physical link 15. The packet which has arrived at the interface card 11 is transferred to an egress-side interface card 11 corresponding to the destination of the packet by the switch card 12. Then, the packet is sent out to a physical link 15 connected to the egress-side interface card 11.

<Configuration Example of Interface Card>

Figure 2:
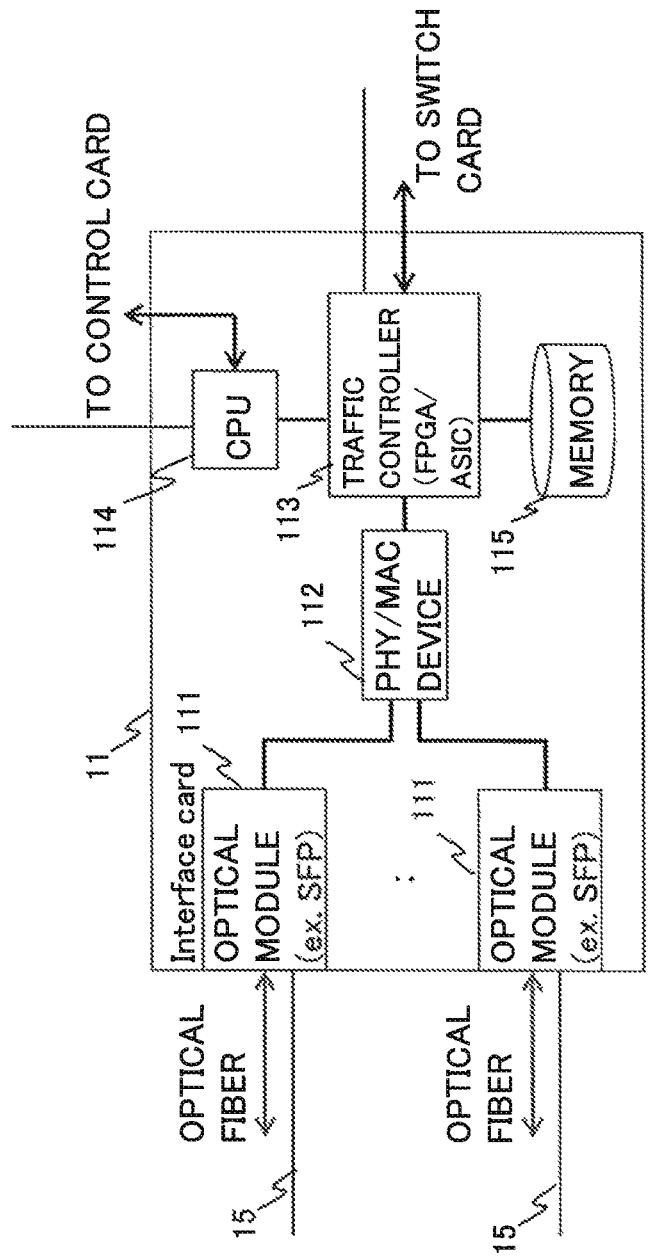
FIG. 2 illustrates a hardware configuration example of an interface card.

FIG. 2 illustrates a hardware configuration example of the interface card 11. FIG. 2 illustrates a configuration example in a case where the physical links are optical fibers. The physical links may be, however, metal cables or wireless links to transmit electrical signals. In this case, the interface card is provided with interface devices or interface circuits corresponding to a form or a mode of the physical links.

The interface card 11 includes a plurality of optical modules 111 to which the physical links 15 (optical fibers) are connected, a PHY/MAC device 112, a field programmable gate array (FPGA)/application specific integrated circuit (ASIC) 113, a CPU 114 and a memory 115.

The optical module 111 performs photoelectric conversion (O/E) and electro-optical conversion (E/O) of a signal. For example, a small form factor pluggable (SFP) module is applied to the optical module 111. The PHY/MAC device 112 is a semiconductor device (an electronic circuit chip) which performs processes of a physical layer (a layer 1) and a media access control (MAC) layer.

The FPGA/ASIC 113 is an exemplification of an electronic device or semiconductor device implemented with traffic management functions such as polishing and shaping (referred to as a "traffic controller"). The traffic management functions include a shaping function by a shaper, that is, a function of controlling the transmission rate of outputted packets by adjusting packet intervals for each flow. The traffic management functions also include a scheduling function by a scheduler, that is, a function of deciding order or times of packets being read from a buffer.

The FPGA/ASIC 113 has a memory and can form buffers (queues) for temporarily storing packets on the memory. The buffers, however, can be also formed on the memory 115.

The kind of the electronic device or semiconductor device forming the traffic controller is not limited to the FPGA/ASIC. A programmable logic device (PLD) other than an integrated circuit (IC), an Large Scale Integration (LSI) and an FPGA can be also applied instead of or in addition to the FPGA/ASIC. In the description below, the FPGA/ASIC 113 will be expressed as the "traffic controller 113". The traffic controller 113 is an example of a "traffic control device" and functions as input-type schedulers 20 and 20A to be described later.

The CPU 114 is a local processor which controls operation of the interface card 11 in accordance with a control instruction from the CPU 16 of the control card 13. The memory 115 is a local memory and stores programs executed by the CPU 114 and data used when the programs are executed.

The interface card 11 transfers packets in both of a first direction in which a packet transferred from the physical link 15 to the switch card 12 and a second direction in which a packet is transferred from the switch card 12 to the physical link 15.

An optical signal inputted from the physical link 15 (optical fiber) is converted to an electrical signal by the optical module 111 and handed over to the PHY/MAC device 112. The PHY/MAC device 112 extracts a packet by PHY and MAC processing and gives the packet to the traffic controller 113. The packet is transferred to the switch card 12 via the traffic controller 113.

On the contrary, a packet received from the switch card 12 is inputted to the PHY/MAC device via the traffic controller 113, and a signal generated by the MAC and PHY processing is converted to an optical signal by the optical module 111 and sent out to the physical link 15 (optical fiber).

As described above, a first route through which a packet flows in the first direction and a second route through which a packet flows in the second direction are provided in the traffic controller 113. Shaper and scheduler functions can be provided on one of the first and second routes. For example, the shaper and scheduler functions are implemented in the traffic controller 113 so that traffic processing (shaping and scheduling) for a packet flowing through the second route is executed.

The traffic controller 113 performs writing and reading of a packet to and from a buffer for the traffic processing. The traffic controller 113 also manages a table in which setting information for polishing and shaping is stored.

The table is stored in the memory the traffic controller 113 has or the memory 115. Furthermore, the traffic controller 113 also has an interface with the CPU 114 for software processing, such as collection of statistical information, and a user setting interface.

Reference Example

In each of embodiments described below, the interface card 11 described above is provided with the traffic controller 113 implemented with "input-type" shaper and scheduling functions (referred to as an "input-type scheduler"). The input-type scheduler will be described below.

Figure 3:
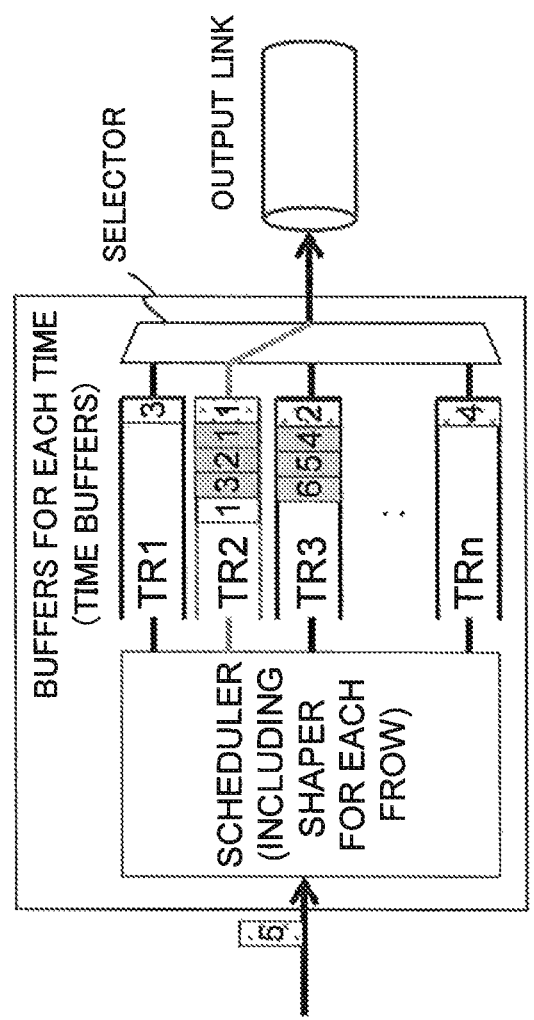
FIG. 3 is a diagram schematically illustrating an input-type scheduler (input-type scheduling system)

FIG. 3 is a diagram schematically illustrating the input-type scheduler (input-type scheduling system). In the input-type scheduler, a plurality of buffers (queues) are prepared for times, respectively. Each buffer is called a time buffer. The scheduler (scheduler/shaper) is arranged at the previous stage of the time buffers. The scheduler includes a shaper for each packet flow. On the other hand, at the subsequent stage of the time buffers, a selector (a queue selector) is arranged which selects one from among the time buffers as time elapses.

When a packet arrives at the scheduler/shaper, the scheduler/shaper decides (determines) the time of reading the packet (packet reading time) by the shaping and scheduling functions. The packet is stored into one of the time buffers corresponding to the decided readout time. In this way, packets from multiple flows which arrive at the scheduler/shaper are allocated into time buffers according to shaping and scheduling results.

The selector changes the time buffer to be selected as time elapses. Thereby, a packet stored at the top of the selected time buffer is read at a readout time and sent out to an output link via the selector.

According to the configuration of the input-type scheduler, an output side (the selector) selects a train of packets arranged in accordance with readout times, in accordance with the readout times. Thereby, it is possible to avoid output conflict which is a problem in speeding up.

Figure 4:
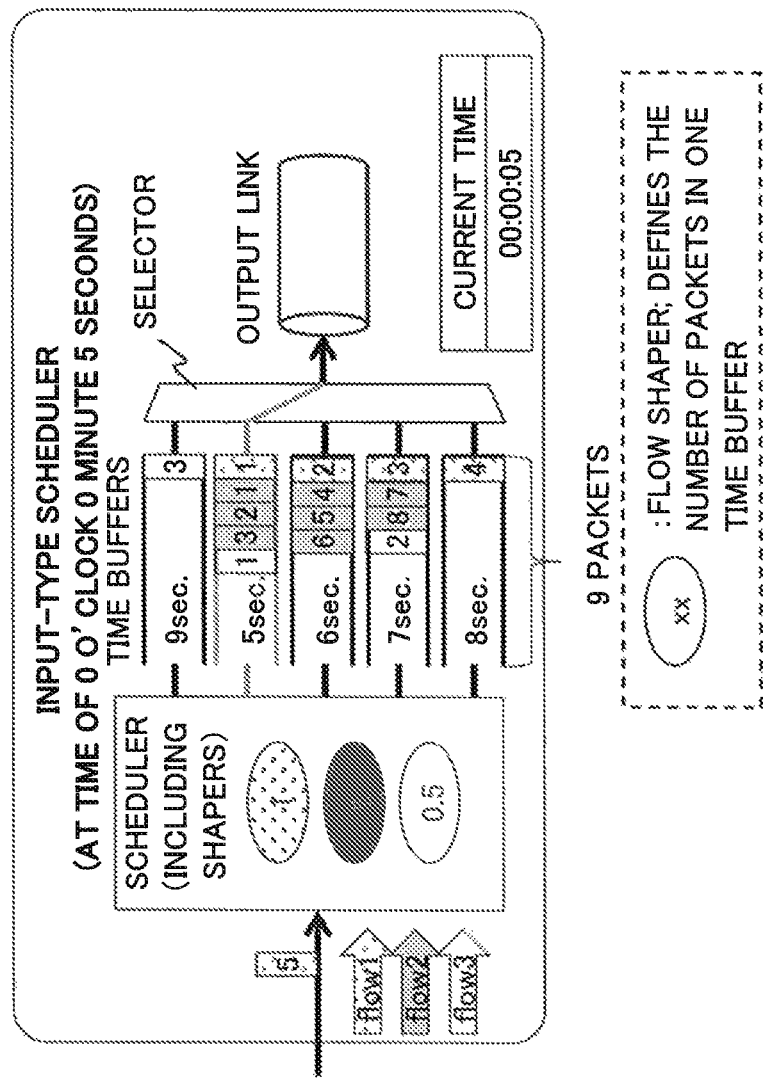
FIG. 4 is an explanatory diagram of the input-type scheduler (input-type scheduling system)

FIG. 4 is an explanatory diagram of the input-type scheduler (input-type scheduling system). The input-type scheduler includes the scheduler, the shaper for each flow, the time buffers and the selector as also illustrated in FIG. 3. The "time buffer" has a form in which reading of packets in a certain buffer is started at a predetermined readout time, and the reading of the packets in the certain buffer ends by the time of starting reading of the next buffer.

Therefore, the capacity of each time buffer is set to such a size that reading is completed by the time of starting reading of the next time buffer. For example, in FIG. 4, a packet stored in an time buffer of "5 seconds" is read during a time period between 5.0 seconds and 6.0 seconds (the time of starting the next reading).

In other words, the moment the current time becomes 0 o'clock 0 minute 5 seconds, the selector selects the time buffer of "5 seconds" and reads packets stored in the time buffer sequentially from the top. In the example illustrated in FIG. 4, nine fixed-length packets can be outputted from the time buffer per second. Therefore, the capacity (size) of each time buffer is set to correspond to nine packets.

When the current time becomes 0 o'clock 0 minute 6 seconds, the selector switches to the next time buffer "6 seconds". In other words, even if a packet does not exist anymore in the time buffer "5 seconds" during the time period between 0 o'clock 0 minute 5 seconds and 0 o'clock 0 minute 6 seconds, switching to the next time buffer is not performed.

A memory area used for the time buffer "5 seconds" is used again as an time buffer "10 seconds" after reading of the time buffer "5 seconds" ends. Thus, by a future-direction time buffer being cyclically generated in the memory area used as time buffers, the time buffers are continuously held for a future predetermined time period irrespective of the current time. Time which can be spent for reading from one time buffer (1 second in the example in FIG. 4) is called a time region (TR).

A case is assumed where packets of a certain user's packet flow (flow 1) are desired to be sent out at a transmission rate of 1 packet/second, in an environment in which time buffers exist as illustrated in FIG. 4. In this case, one packet of flow 1 is arranged in each time buffer as illustrated in FIG. 4. Thereby, it is possible to send out the packets at desired intervals.

When the requested transmission rate of another user's packet flow (flow 2) is 3 packets/second, three packets are arranged in one time buffer. When the requested transmission rate of another user's packet flow (flow 3) is 0.5 packets/second, one packet is arranged in each one of alternate time buffers. In this way, requests of flow 2 and flow 3 are satisfied.

Thus, the time buffer style (time buffer system) is characterized in that rate control (shaping) can be executed by adjusting the quantity of packets accumulated (buffered) in one buffer and arrangement intervals of packets.

In order to appropriately perform shaping and scheduling, the scheduler decides (determines) a time buffer for temporarily storing an arrived packet. The scheduler includes a shaper for each flow, and the shaper decides (determines) the number of packets which can be arranged in one time buffer. For example, in FIG. 4, when the next packet of flow 1 arrives, it is decided that the packet is to be arranged in a time buffer "9 seconds" because the requested transmission rate of flow 1 is 1 packet/second.

Figure 5:
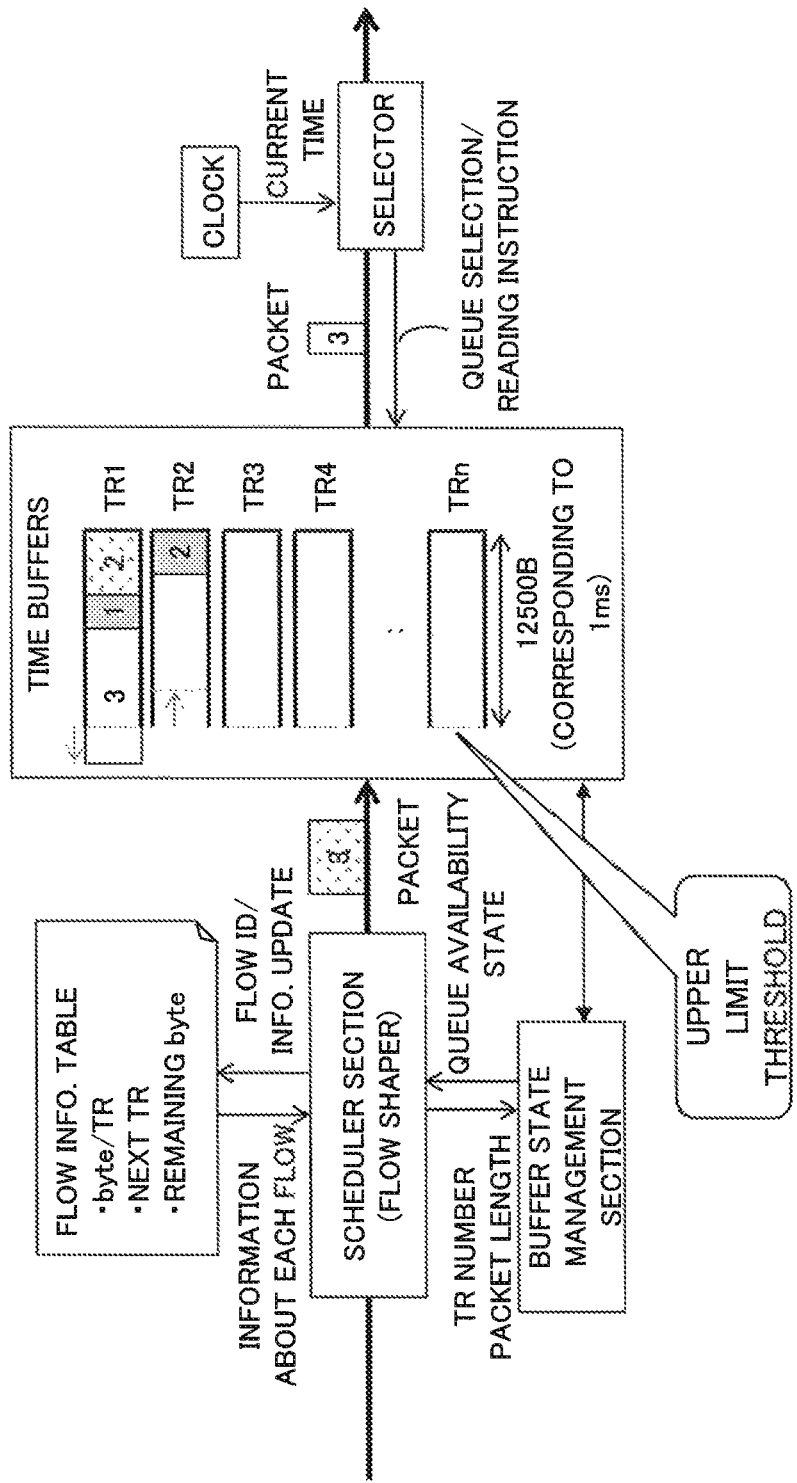
FIG. 5 is a diagram illustrating another configuration example of the input-type scheduler.

FIG. 5 is a diagram illustrating another configuration example of the input-type scheduler. In the example illustrated in FIG. 5, the input-type scheduler includes a flow information table and a buffer state management section in addition to the scheduler (including flow shapers). The input-type scheduler also includes a plurality of time buffers corresponding to multiple times, respectively. In the example illustrated in FIG. 5, a plurality of time buffers corresponding to TR1 to TRn (n is a natural number) are illustrated.

In the example illustrated in FIG. 5, an amount which can be arranged in one time buffer (TRx) is indicated by the quantity of bytes in order to improve shaping granularity and to be compatible with variable length packets. The flow information table stores, for each flow, information (referred to as "flow information") which includes the number of bytes which can be arranged in one time buffer (bytes/TR, hereinafter, also referred to as a "permissible band"), the identifier of a time buffer in which a packet is to be arranged next (a next time buffer (next TR)), and the quantity of bytes which can be arranged in the next time buffer (remaining bytes). The buffer state management section manages the states of availability of the buffers.

When a packet reaches, the scheduler extracts information which includes at least a flow ID and a packet length, from the packet. The scheduler obtains flow information corresponding to the flow ID from the flow information table. Next, the scheduler inquires of the buffer state management section about the availability (empty state) of each of the time buffers on the basis of the identifier (for example, the time buffer number) of the next time buffer and the packet length.

Then, the scheduler decides a time buffer into which the packet is to be arranged, in consideration of the availability obtained from the buffer state management section and performs storage (queuing) to the time buffer. Thereby, the packet is arranged at the end of a packet train stored in the time buffer. The scheduler updates the flow information (the next TR, remaining bytes) of the packet which has been buffered (queued) (rewrites the flow information).

In the case where a variable length packet is treated, the amount of data which can be accommodated (queued) in the time buffer (TRx) is managed in the number of bytes as a queue upper limit threshold (Q upper limit threshold).

Basically, it is not possible to perform queuing to such a time buffer that the quantity of accommodated packets exceeds the queue upper limit threshold. However, it may happen that, as a result of queuing a variable length packet into one time buffer, the accommodated quantity exceeds the queue upper limit threshold. In FIG. 5, a state is illustrated in which the quantity accommodated in the first time buffer (time buffer TR1) has exceeded the queue upper limit value, as an example.

In this case, the queue upper limit threshold of the time buffer TR2, which is the next time buffer, is reduced by an excess of the accommodated quantity of the time buffer TR1 over the queue upper limit threshold (difference between the accommodated quantity and the queue upper limit threshold). Thus, in a manner that an average value of the quantities of sent-out packets becomes the queue upper limit threshold in a time frame formed by multiple time regions (TRs) such as "TR1+TR2", the total quantity of sent-out packets in the time frame is adjusted.

In principle, the selector performs switching (selection) of time buffers based on a current time provided from a clock which measures time. However, when the number of packets exceeding the queue upper limit threshold have been accumulated in one time buffer, it is not possible to complete reading of the packets within a predetermined time region (TR), as described above. Therefore, when starting reading from a time buffer, the selector suspends switching until the time buffer becomes empty.

Figure 6:
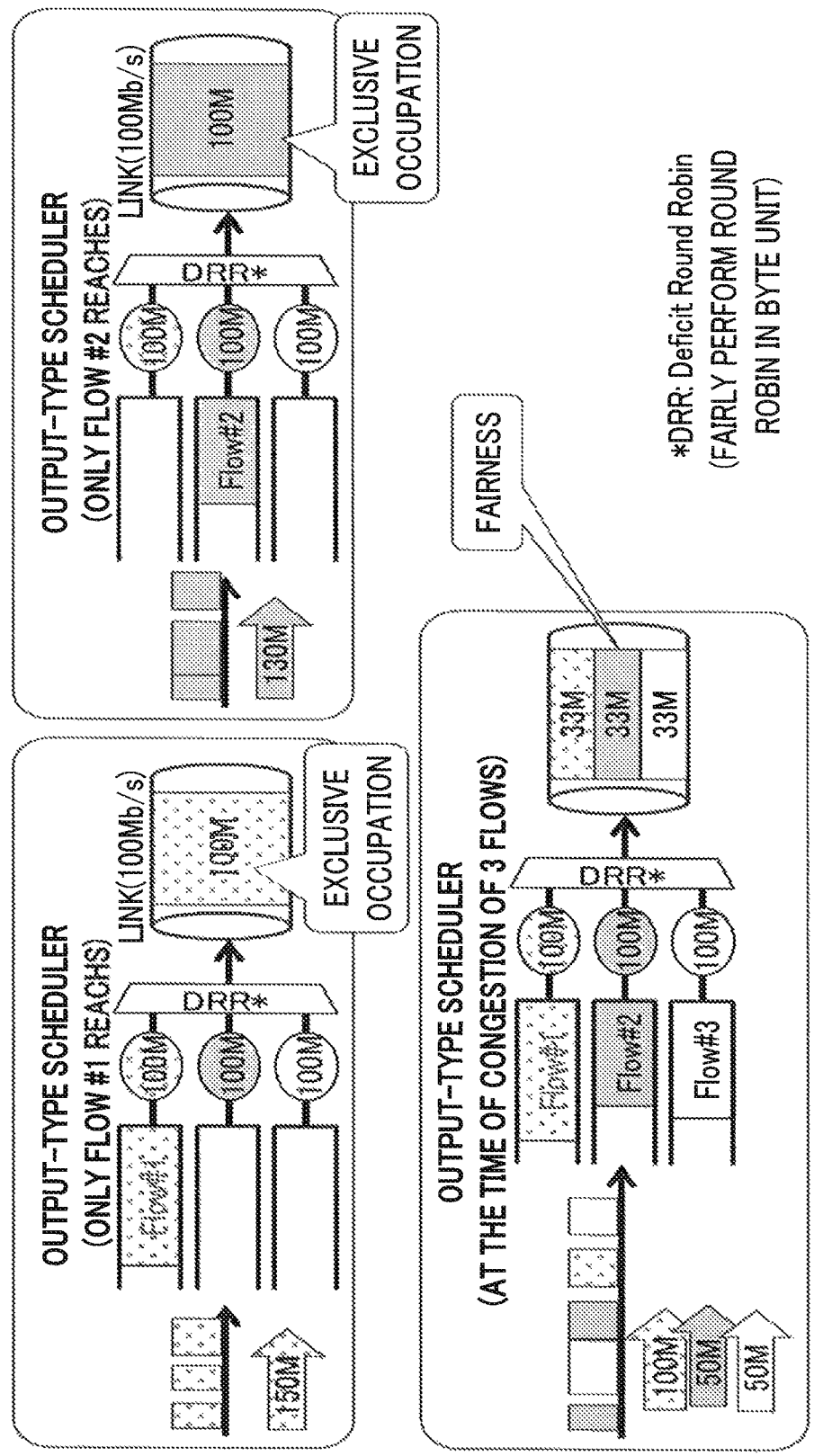
FIG. 6 is an explanatory diagram of best effort.

The packet relay apparatus may handle a best effort (BE) class in order to achieve QoS. FIG. 6 is an explanatory diagram of best effort. In FIG. 6, an "output-type" scheduler is illustrated for the purpose of explanation. In FIG. 6, a case is assumed where three buffers corresponding to three BE-class packet flows (Flow #1, Flow #2 and Flow #3) are provided, and packets of these three flows are sent out to an output link (band 100 Mbps). The selector which performs reading from the three buffers performs round robin (RR) for fair reading in bytes, for example, in accordance with an algorithm called Deficit Round Robin (DRR).

The selector (DRR) operates with 100 M bytes as a rate at which reading from each buffer is possible, in accordance with a band upper limit value (100 Mbps) of the output link. At the upper left of FIG. 6, a case is illustrated where only packets (150 M) of Flow #1 among the three flows have arrived. In this case, the accommodated quantity of each of Flow #2 and Flow #3 is 0, packets of Flow #1 are transmitted at a rate equal to a link band upper limit value (100 Mbps). As a result, a state is brought about in which Flow #1 occupies the output link.

At the upper right of FIG. 6, a case is illustrated where only packets (130 M) of Flow #2 have arrived. In this case, the packets of Flow #2 are transmitted at the rate equal to the link band upper limit value (100 Mbps), and a state is brought about in which Flow #2 occupies the output link. Thus, when an output link is empty (unused), one flow which has occurred alone can occupy the band of the output link.

At the lower side of FIG. 6, a state is illustrated in which each of Flow #1, Flow #2 and Flow #3 has occurred and congestion has occurred. In this case, the selector performs reading from each buffer (band allocation) so that each flow fairly (equally) occupies a band of the output link, in accordance with the DRR algorithm. Thereby, the band of each flow in the output link becomes equal (for example, 33 Mbps).

As described above, the output-type scheduler can easily achieve (1) effective utilization of a link band and (2) assurance of fairness in band occupation among flows at the time of congestion. In the case where the configuration of the input-type scheduler is adopted in order to avoid the demerit of the output-type scheduler (output conflict), it is difficult to enable both of (1) and (2) above.

The reason will be described with the use of FIGS. 7A and 7B. In the examples illustrated in FIGS. 7A and 7B, three packet flows (Flow #1, Flow #2 and Flow #3) exist, and it is desired that any of the flows completely uses (occupies) the whole band of an output link when the output link is empty, similarly to FIG. 6.

Figure 7A:
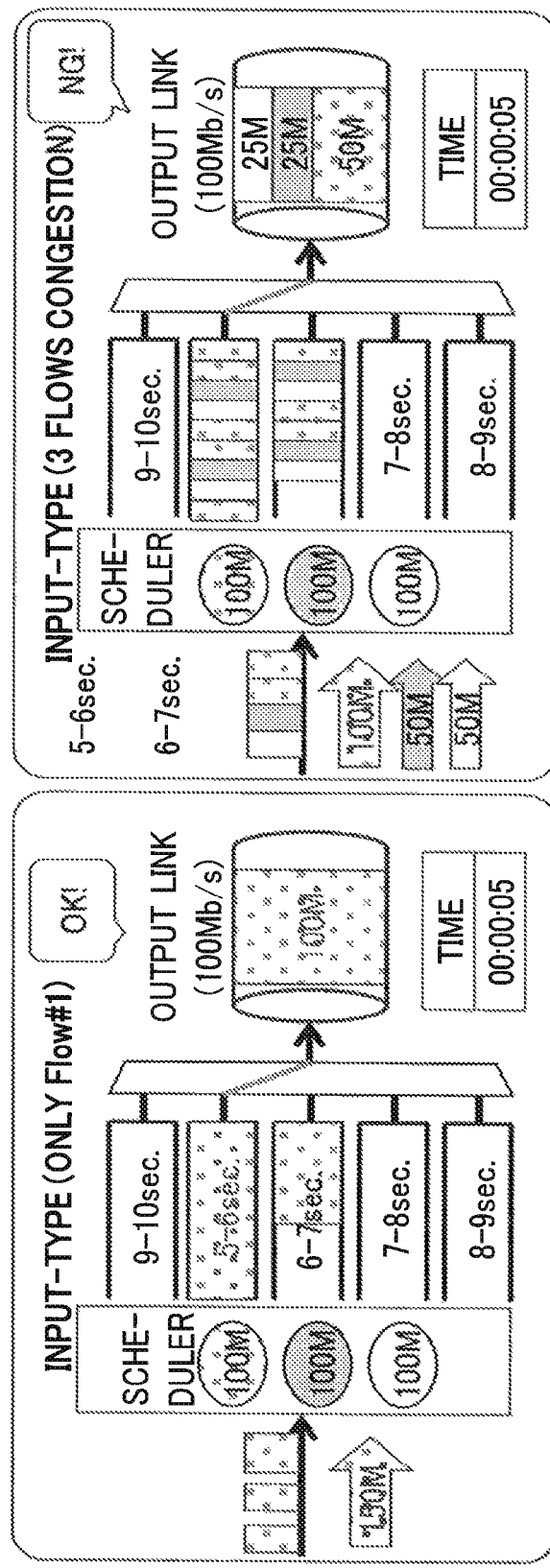
FIG. 7A is an explanatory diagram of a problem of a reference example and illustrates a case where shaping is not performed.
Figure 7B:
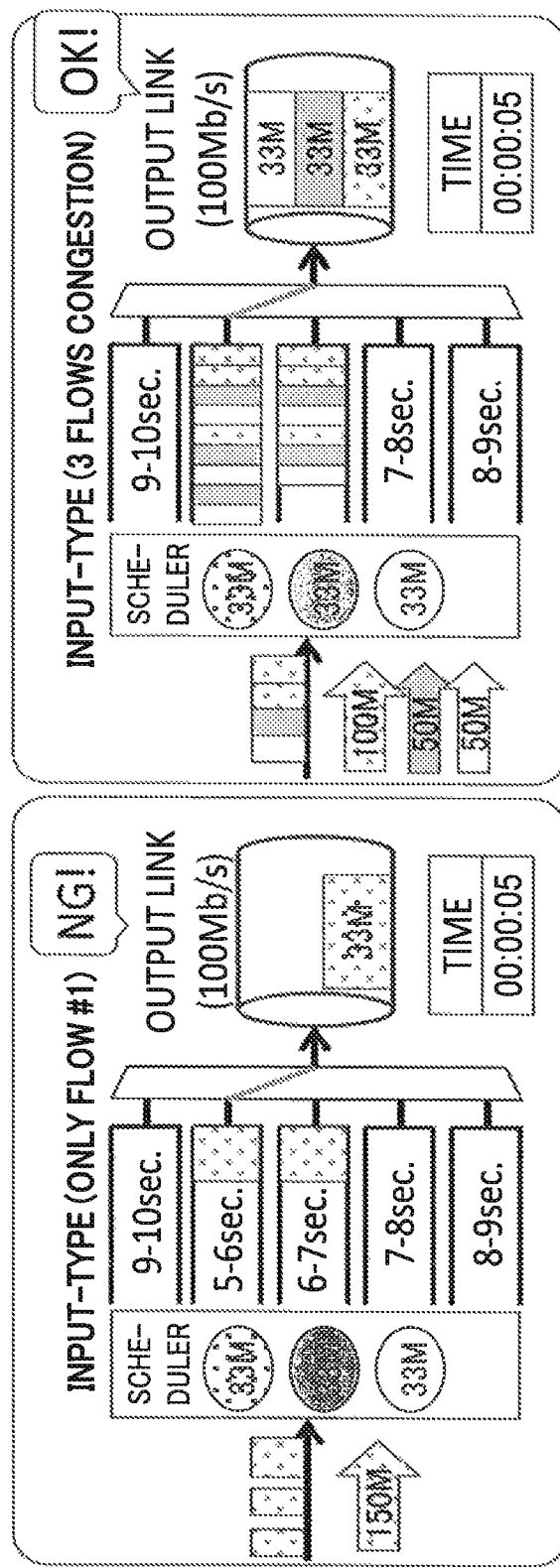
FIG. 7B is an explanatory diagram of a problem of a reference example and illustrates a case where shaping is executed.

FIG. 7A illustrates a case where shaping is not performed in the scheduler (including flow shapers), and FIG. 7B illustrates a case where shaping is executed in the scheduler (including flow shapers).

As described with the use of FIG. 5, in the input-type scheduler, the transmission rate of each flow is adjusted at the scheduler (including flow shapers) at which packets arrive. In the case where shaping is not performed as illustrated in FIG. 7A, however, the packets which arrive at the scheduler are disorderly buffered until buffer overflow occurs. Therefore, the output band is based on input rate ratio. That is, the state of so-called "First input, first served"

is bought about. Therefore, in the case where shaping is not executed, it is not possible to achieve the fairness of (2) above.

On the other hand, FIG. 7B illustrates that, in order that the link band (100 Mbps) of the output link is equally shared among the flows, shaping has been executed in a manner that the transmission rate of each flow becomes one third (33 Mbps) of the link band.

However, when the shaping described above is executed, the transmission rate of Flow #1 is suppressed to 33 Mbps by the shaping even in the case where only packets of Flow 1 arrive and packets of Flows #2 and #3 do not arrive, that is, even in a state that Flow #1 can occupy the whole link band. Therefore, a remaining part of the link band is not used even though the remaining part is in an available state. Thus, when shaping is executed, it is not possible to achieve the effective utilization of a link band of (1) described above.

In the embodiments described below, description will be made on a traffic control method capable of achieving both of the effective utilization of a link band and the assurance of fairness among flows, in an input-type scheduler.

[First Embodiment]p In a first embodiment, consideration will be made on improvement of a scheduling system based on the configuration in which shaping is not performed as described with the use of FIG. 7A. That is, in the first embodiment, shaping is not executed in a scheduler at which packets arrive. In this case, the problem exists that packets of each flow are buffered disorderly (without rate adjustment) as described with reference to the configuration illustrated in FIG. 7A.

To cope with this, in the first embodiment, a penalty is given to such a flow that the amount of buffered data is larger than the amount of data of the other flows due to disorderly buffering, with regard to future buffering. Thereby, buffering of packets of each flow is controlled so that fairness is secured from a long-span point of view even though it seems that fairness among flows is not assured from a local point of view.

Figure 8:
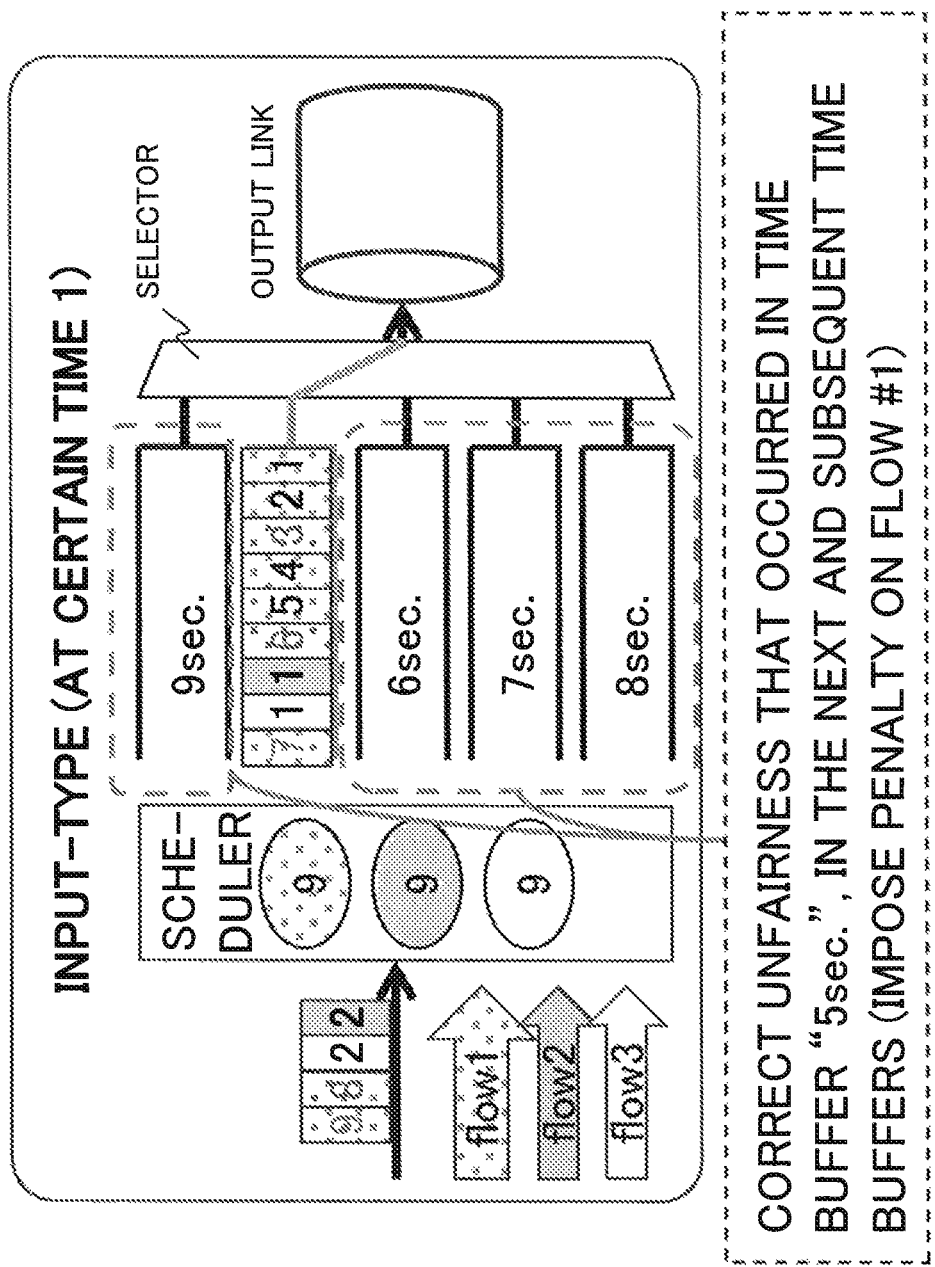
FIG. 8 is an explanatory diagram of a way of thinking of an input-type scheduler in a first embodiment.

FIG. 8 is an explanatory diagram of a way of thinking of the first embodiment. FIG. 8 illustrates an input-type scheduler having a configuration similar to that of the input-type scheduler illustrated in FIG. 4. That is, fixed length packets of three BE-class packet flows (flow 1, flow 2 and flow 3) are inputted to the input-type scheduler. The fixed length packets of each flow are sent out to an output link in accordance with a scheduling result.

In the example illustrated in FIG. 8, however, the scheduler does not perform shaping. Therefore, for each of the three packet flows, the number of packets which can be buffered (queued) in one time buffer is 9, which is equal to the number of fixed length packets which can be accumulated in one time buffer (a queue upper limit value).

The scheduler performs buffering into a time buffer until the accommodated quantity reaches the queue upper limit value (9) in order of arrival of packets irrespective of the flow. FIG. 8 illustrates unfairness that, as a result of the operation of the scheduler described above, seven packets of flow 1 are stored in a "5 seconds" time buffer (time buffer TR5), while, for each of flows 2 and 3, one packet is stored.

In the first embodiment, in time buffers of "6 seconds" to "9 seconds" (time buffers TR6 to TR9) corresponding to the next and subsequent time buffers after the time buffer TR5, packets of flow 1 are caused to be difficult to be buffered in comparison with packets of flows 2 and 3, in order to correct the unfairness which occurred in the time buffer TR5.

More specifically, a method is adopted in which, for each flow, "a restriction is imposed on available future-side time buffers according to the number of packets (the quantity of packets (the amount of data)) accumulated in time buffers during a certain predetermined period." In other words, for a certain flow, a time buffer in a future direction from the current time in which packets of the flow can be buffered is decided according to the number of packets buffered during a predetermined period. The length of the predetermined period can be appropriately set, and one or more time buffers can be selected from the multiple time buffers, as the buffers in which packets are to be accumulated during the predetermined period.

For example, when, for a certain flow, the number of packets buffered for the predetermined period is two or smaller, it is decided that packets of the flow can be buffered up to a time buffer corresponding to a time obtained by adding 2 to the current time (current time+2). When the number of buffered packets is 3 to 6, it is decided that packets of the flow can be buffered up to a time buffer corresponding to a time of (current time+1). When the number of packets is seven or larger, it is decided that buffering is possible up to a time buffer corresponding to (current time+0).

Figure 9:
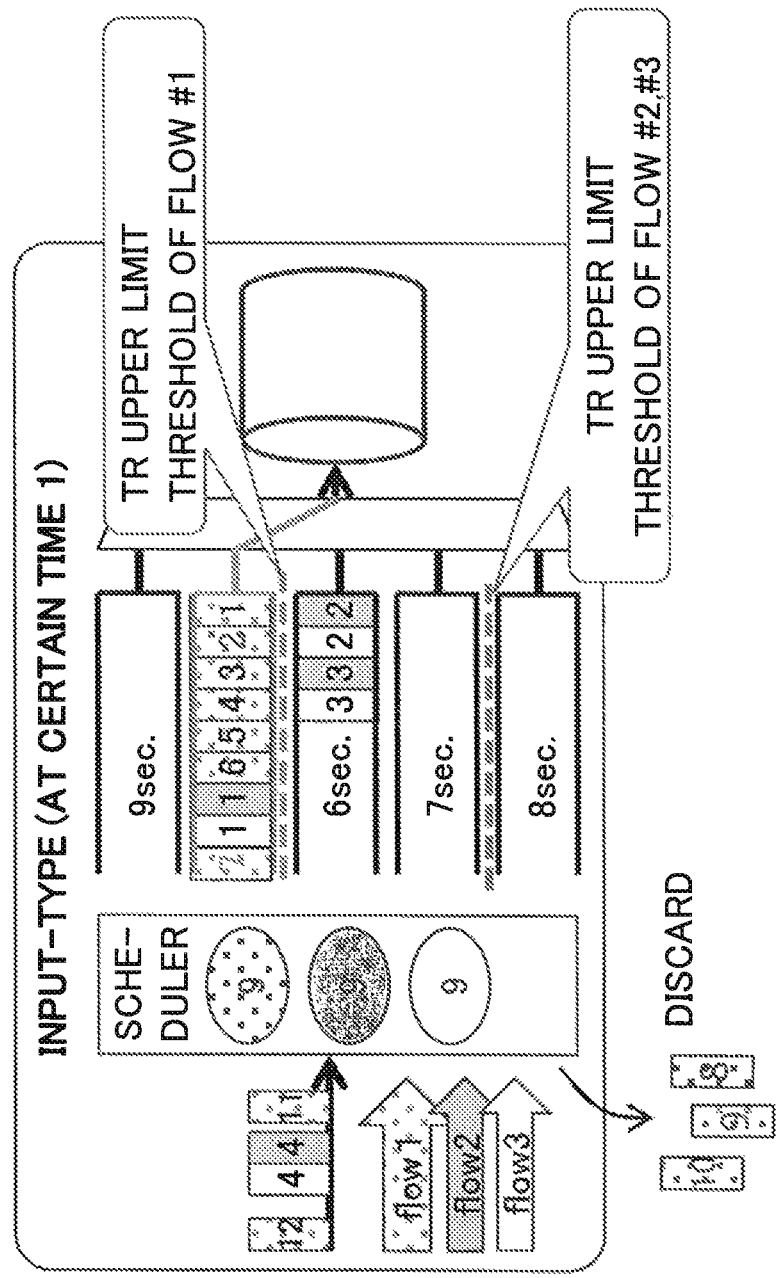
FIG. 9 is an explanatory diagram of a method of solution by the input-type scheduler in the first embodiment.

FIG. 9 is an explanatory diagram of buffering control in the first embodiment. For example, in the case of assuming that the predetermined period is equal to time of accumulation of packets into the time buffer TR5, time buffers into which packets of flow 1 can be buffered are restricted up to the time buffer TR5, as illustrated in FIG. 9. Therefore, packets of flow 1 which have arrived the scheduler when the number of packets stored in the time buffer TR5 reaches the queue upper limit threshold (9) (in FIG. 9, packets of "8" to "10") are discarded without being buffered into the "6 seconds" and subsequent time buffers.

The buffering restriction on flow 1 is released when the TR of the time buffer "5 seconds" decided as the upper limit of time buffers for which buffering is possible expires (when the current time buffer becomes the time buffer "6 seconds").

In contrast, the number of packets of each of flow 2 and flow 3 buffered in the time buffer "5 seconds" is one. Therefore, buffering of packets can be performed up to a time buffer of the current time+2, that is, "7 seconds". In the example illustrated in FIG. 9, a configuration is adopted in which time buffers corresponding to four times ahead of the current time are cyclically generated in advance with the use of a memory area where five time buffers can be generated.

As described above, after the current time becomes 0 o'clock 0 minute 6 seconds, and the "6 seconds" time buffer becomes a current time buffer, the restriction is released, and buffering of packets of flow 1 becomes possible again. Therefore, packets of flow 1 to be buffered into the time buffer "6 seconds" are restricted to packets which arrive at the scheduler in the TR of the time buffer "6 seconds". As a result, there is a strong possibility that the number of packets of flow 1 accumulated in the time buffer of "6 seconds" is smaller than the numbers of packets of flow 2 and flow 3.

Therefore, at least the time buffer "6 seconds" is occupied by a larger number of packets of flow 2 and flow 3 than the number of packets of flow 1. As a result, the unfairness of flow 1 which occurred in the time buffer "5 seconds" is corrected.

When the number of packets of flow 2 or 3 is larger than that of flow 1 in the time buffer of "6 seconds", a penalty is given that it becomes impossible to accumulate packets arriving at time buffers subsequent to the "6 seconds", on the contrary. In this way, such traffic control is performed that, by putting a flow which obtained a benefit at certain time (which caused unfairness) at a disadvantage at different time, the transmission rate of each flow converges to the vicinity of a fair value when seen in a relatively long span.

(First Aspect)

Figure 10:
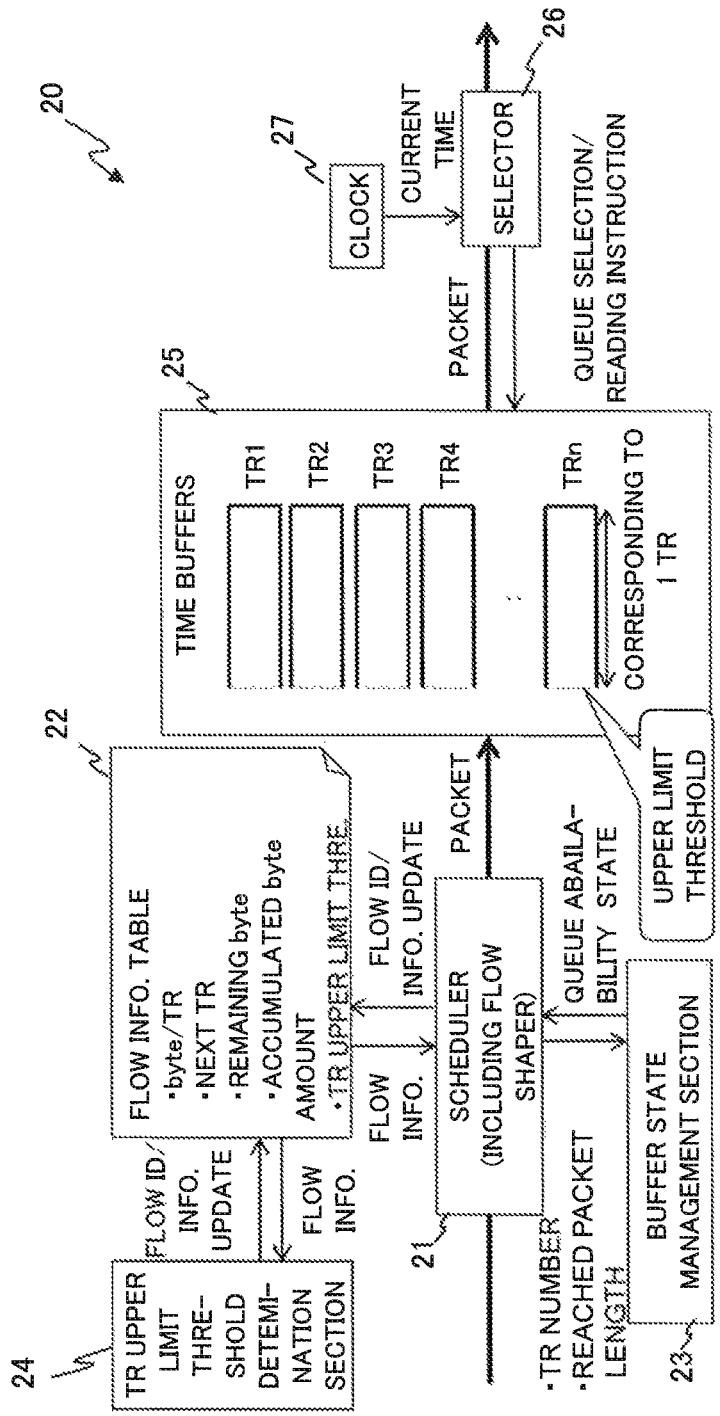
FIG. 10 illustrates a configuration diagram of the input-type scheduler according to the first embodiment.

FIG. 10 illustrates a configuration diagram of the input-type scheduler according to the first embodiment. In FIG. 10, an input-type scheduler 20 includes a scheduler 21 including flow shapers, a flow information table 22, a buffer state management section 23, a TR upper limit threshold determination section 24, a memory area 25 for storing multiple time buffers, a selector 26 and a clock 27.

The scheduler 21, the buffer state management section 23, the TR upper limit threshold determination section 24 and the selector 26 are functions which the electronic device or semiconductor device forming the traffic controller 113 illustrated in FIG. 2 has. The memory area 25 is provided in the memory the traffic controller 113 has or the memory 115, as described above. For example, a clock included in the interface card 11 is used as the clock 27.

In the case where the input-type scheduler 20 is arranged in a first-direction packet route, packets outputted from the PHY/MAC device 112 arrive at the scheduler 21, and packets outputted from the selector 26 are transmitted to the switch card 12. On the other hand, in the case where the input-type scheduler 20 is arranged in a second-direction packet route, packets transmitted from the switch card 12 arrive at the scheduler 21, and packets outputted from the selector 26 are transmitted to the PHY/MAC device 112.

The memory area 25 includes multiple time buffers corresponding to multiple times (time regions TR). FIG. 10 illustrates a plurality of time buffers corresponding to TR1 to TRn (n is a natural number) as an example.

However, the memory area 25 may have, for example, the following configuration. That is, a predetermined number x (x is a natural number) of time buffers up to a time ahead of a certain time (TRx) by a predetermined time are generated in the memory area 25, and time buffers corresponding to past times earlier than the current time are reused as future time buffers.

For example, five time buffers TR1 to TR5 corresponding to a predetermined number of time regions (for example, five time regions TR1 to TR5) are generated in the memory area 25 first. When the current time advances from TR1 to TR2, the time buffer TR1 corresponding to a past time buffer is used as a time buffer TR6 corresponding to TR6 ahead of the current time TR2. Thus, the memory area 25 holds (stores) a predetermined number of time buffers corresponding to times up to a time ahead of the current time by a predetermined time.

The selector 26 selects a time buffer of a TR corresponding to a current time obtained from the clock 27 and performs reading of packets from the time buffer during a period corresponding to the TR. Therefore, each time buffer has a capacity corresponding to one TR. The length of one TR can be appropriately set. The capacity corresponding to one TR is used as the queue upper limit threshold (Q upper limit threshold). The selector 26 basically performs switching of time buffers for each period of one TR in order of times.

The flow information table 22 stores flow information about each flow. The flow information includes "permissible band (bytes/TR)" indicating, for the flow, the amount of data (the number of bytes) which can be arranged (buffered) in one time buffer, an identifier of a time buffer in which packets are to be arranged next (next TR), and the quantity of bytes which can be arranged in the next time buffer (remaining bytes). In the first embodiment, time buffers are identified with TR numbers, and the TR numbers are used as the identifiers of the time buffers. The permissible band corresponds to a shaping rate.

Furthermore, the flow information includes a "quantity of accumulated bytes (accumulated byte amount)" and a "TR upper limit threshold". The "quantity of accumulated bytes" indicates the quantity of packets (the amount of data) which have been buffered before a predetermined period elapses. The "TR upper limit threshold" indicates a time buffer corresponding to the upper limit of time buffers which the flow can use. Time buffers in a future direction from the current time which the flow can use are specified by the "TR upper limit threshold".

The TR upper limit threshold determination section 24 (hereinafter referred to as the "determination section 24") decides the TR upper limit threshold for each flow. In the flow information table, the TR upper limit threshold for each flow decided by the determination section 24 is stored.

When a packet of a certain flow is accumulated in any of the time buffers, the packet length (the number of bytes) of the packet is added to the "quantity of accumulated bytes" stored as the flow information about the certain flow. The determination section 24 periodically acquires the flow information which includes the "quantity of accumulated bytes" of each flow. At this time, the determination section 24 resets the value of the "quantity of accumulated bytes" in the flow information table 22 (to 0). The determination section 24 decides the TR upper limit threshold of each flow in accordance with a predetermined rule, on the basis of the acquired flow information. The determination section 24 writes the decided TR upper limit threshold of each flow into the flow information table 22.

The scheduler 21 performs an operation as described below for each arrived packet. That is, the scheduler 21 identifies the flow of the packet on the basis of information (for example, header information) stored in the packet.

For example, when the packet is a TCP (UDP)/IP packet, the scheduler 21 identifies the packet flow using transmission source and destination port numbers and transmission source and destination IP addresses stored in the TCP (UDP)/IP header of the packet as the identifier of the flow (flow identifier). Furthermore, the scheduler 21 can obtain a packet length from the information stored in the header of the packet.

The scheduler 21 accesses the flow information table 22 and obtains flow information corresponding to the flow identifier obtained from the packet. The scheduler 21 also obtains the identifier (buffer number) of a time buffer being read and information indicating the state of availability of each time buffer, from the packet state management section 23.

The scheduler 21 decides a time buffer into which the packet arrived at (inputted into) the scheduler 21 is to be buffered, on the basis of the flow information table 22 and the information obtained from the buffer state management section 23.

On the other hand, when the value of the "next TR" in the flow information exceeds the TR upper limit threshold or when there is no available time buffer among time buffers below the TR upper limit threshold, the scheduler 21 discards the arrived packet. On the other hand, when there is a time buffer into which the packet is to be buffered, the scheduler 21 accumulates the packet into the time buffer. At this time, the scheduler 21 adds the packet length of the packet to the "quantity of accumulated bytes" in the flow information table 22.

According to the input-type scheduler according to the configuration of the "first aspect" described above, it becomes possible to enable both of effective accommodation (effective utilization of a link band) and averaged fair band allocation for a BE-class traffic for which excessive accommodation (overbooking) is permitted.

(Second Aspect)

As described above, the scheduler 21 decides a time buffer into which a packet is to be accumulated according to the TR upper limit threshold which the determination section 24 has decided on the basis of the "quantity of accumulated bytes" of each flow.

As the quantity of accumulated bytes used to determine the TR upper limit threshold, the latest value can be used all the times. FIG. 11 illustrates a data structure example of the flow information table. The flow information table 22 is constituted by multiple entries prepared for each flow. The entries include the "permissible band (bytes/TR)", the "next TR" and the "remaining bytes" which have been described. Furthermore, the entries include "latest accumulated bytes" and a TR upper limit threshold decided on the basis of the "latest accumulated bytes".

As the "latest accumulated bytes", the amount of data buffered up to the present after reset by the determination section 24 is stored. As described in the first aspect, each time accumulating a packet into a time buffer, the scheduler 21 adds the packet length of the accumulated packet to the "latest accumulated bytes". Such a value of the "latest accumulated bytes" is used as a reference value of the TR upper limit threshold by the determination section 24.

According to the "second aspect", only the "latest accumulated bytes" measured from the last reset time point is stored into the flow information table 22 as "accumulated bytes". By adopting such a configuration that the quantity of bytes accumulated during a predetermined period in the past does not remain in the flow information table 22 as described above, it is possible to reduce the amount of memory of the flow information table 22. Furthermore, according to the second aspect, it becomes possible to perform calculation of the TR upper limit threshold capable of alertly following change in a link band.

(Third Aspect)

It is also possible to use not the quantity of the "latest accumulated bytes" but a value obtained by averaging accumulated amounts, unlike the second aspect. FIG. 12 illustrates a data structure example of the flow information table in the case where the average value of the "quantities of accumulated bytes" is applied.

In a flow information table 22A, in addition to the "latest accumulated bytes" described in the second aspect, "average accumulated bytes" which is a value obtained by averaging the "latest accumulated bytes" is added. In a third aspect, the "average accumulated bytes" is used as a reference value for deciding the TR upper limit threshold, instead of the "latest accumulated bytes".

Calculation of the "average accumulated bytes" can be performed, for example, by summing up the "latest accumulated bytes" and the "average accumulated bytes" and dividing the result by 2 when the determination section 24 reads the "latest accumulated bytes".

According to the third aspect, by adopting the configuration in which the quantity of bytes accumulated during a predetermined period in the past does not remain in the flow information table 22A similarly to the second aspect, it is possible to reduce the capacity of the flow information table 22A. Furthermore, according to the third aspect, the TR upper limit threshold is decided on the basis of the "average accumulated bytes". Thereby, it is possible to grasp a long-term band use state without following momentary change in the band. Therefore, it is possible to suppress significant fluctuation in the TR upper limit threshold, and it becomes possible to improve fairness among flows.

(Fourth Aspect)

As a method for setting a TR upper limit threshold applicable to the first to third aspects, the threshold is set at a boundary between time buffers. The TR upper limit threshold is indicated by an integer, for example, "TR upper limit threshold=+5".

For example, it is assumed that the current time buffer is "TR10", and the TR upper limit threshold is "+5". In this case, buffering up to the upper limit permitted by the "permissible band (bytes/TR)" is possible up to a time buffer of TR15. However, buffering for TR16 and subsequent time buffers is inhibited.

According to a fourth aspect, the granularity of the time buffer upper limit threshold is specified by time buffers (in units of time buffers). Thereby, the boundary of whether buffering is possible or not is clearly set between time buffers. It also becomes possible to provide a relatively simple mechanism for judging whether a packet is to be discarded or not when the packet arrives.

(Fifth Aspect)

On the other hand, as a TR upper limit threshold setting method replacing the fourth aspect, there is a method of setting thresholds for the boundaries among time buffers and for the quantities of accumulated bytes in the time buffers. For example, it is permitted that the TR upper limit threshold has a value with decimal places, for example, "TR upper limit threshold=+5.5". That is, the granularity of the time buffer upper limit threshold is specified by the time buffers and amounts which can be accumulated in the buffers. The amount which can be accumulated is expressed by a value obtained by dividing the amount which can be accumulated by capacity corresponding to one TR.

It is assumed that the current time buffer is TR10 at the time of "TR upper limit threshold=+5.5". In this case, buffering up to the upper limit permitted by the "permissible band (bytes/TR)" is possible up to the time buffer of TR15. On the other hand, for the time buffer of TR16, buffering of "the permissible band (bytes/TR)×0.5" is possible. Buffering for TR17 and subsequent time buffers is inhibited.

According to the configuration of a fifth aspect, more detailed buffer area management becomes possible by providing a threshold in a time buffer, and, therefore, it becomes possible to improve fairness.

(Sixth Aspect)

As a TR upper limit threshold decision method applicable to the first to fifth aspects, there is a method of comparing the quantity of accumulated bytes such as the "latest accumulated bytes" and the "average accumulated bytes" with a condition set in advance to derive a TR upper limit threshold.

FIG. 13 illustrates a data structure example of a TR upper limit threshold decision table 24A (table 24A). The table 24A is stored, for example, in the memory 115 and managed by the determination section 24. The table 24A stores TR upper limit thresholds corresponding to ranges of the quantity of accumulated bytes.

The determination section 24 refers to the table 24A in a TR upper limit threshold decision event. When the quantity of accumulated bytes is smaller than 1000 bytes then, the determination section 24 decides "+10" as the TR upper limit threshold. When the quantity of accumulated bytes is 1000 bytes or larger and smaller than 5000 bytes, the determination section 24 decides "+5" as the TR upper limit threshold. When the quantity of accumulated bytes is 5000 bytes or larger, the determination section 24 decides "+2" as the TR upper limit threshold.

In the sixth aspect, correspondence relationships between quantities of accumulated bytes and TR upper limit thresholds are stored in advance, and the determination section 24 decides a TR upper limit threshold by referring to the correspondence relationships. Thus, since the configuration is simple, the circuit scale of the traffic controller 113 can be reduced.

(Seventh Aspect)

Figure 14:
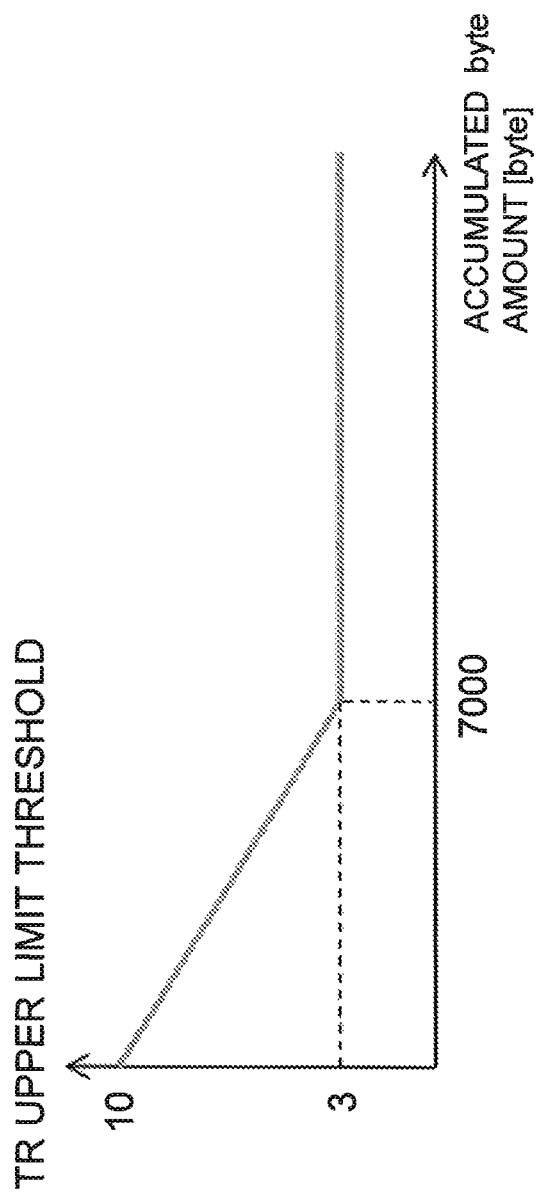
FIG. 14 illustrates an example of a function to derive a TR upper limit threshold.

As a TR upper limit threshold decision method replacing the sixth aspect, a method of using a function with the quantity of accumulated bytes as an input value to derive a TR upper limit threshold is applicable. FIG. 14 illustrates an example of the function to derive a TR upper limit threshold. For example, the determination section 24 can decide a TR upper limit threshold by using a function of [TR upper limit threshold=Max(3, 10−(the quantity of accumulated bytes)/1000)] as illustrated in FIG. 14.

According to a seventh aspect, it is possible to calculate a more detailed TR upper limit threshold in comparison with the sixth aspect, by the TR upper limit threshold being decided with the use of a function. Therefore, it is possible to improve fairness.

(Eighth Aspect)

As a TR upper limit threshold decision method replacing the sixth and seventh aspects, there is a method of considering the permissible band (bytes/TR) for each flow. FIG. 15 illustrates a data structure example of a TR upper limit threshold decision matrix table 24B (a table 24B) which the determination section 24 manages instead of the table 24. The table 24B is stored, for example, in the memory 115.

As illustrated in FIG. 15, the table 24B stores a matrix for deciding a TR upper limit threshold on the basis of correspondence relationships between ranges of the quantity of accumulated bytes and ranges of the permissible band (two-dimensional information). The determination section 24 is capable of reading a TR upper limit threshold corresponding to the quantity of accumulated bytes and a permissible band obtained from flow information, from the table 24B and deciding the read-out TR upper limit threshold as a TR upper limit threshold to be applied to a relevant flow.

Figure 16:
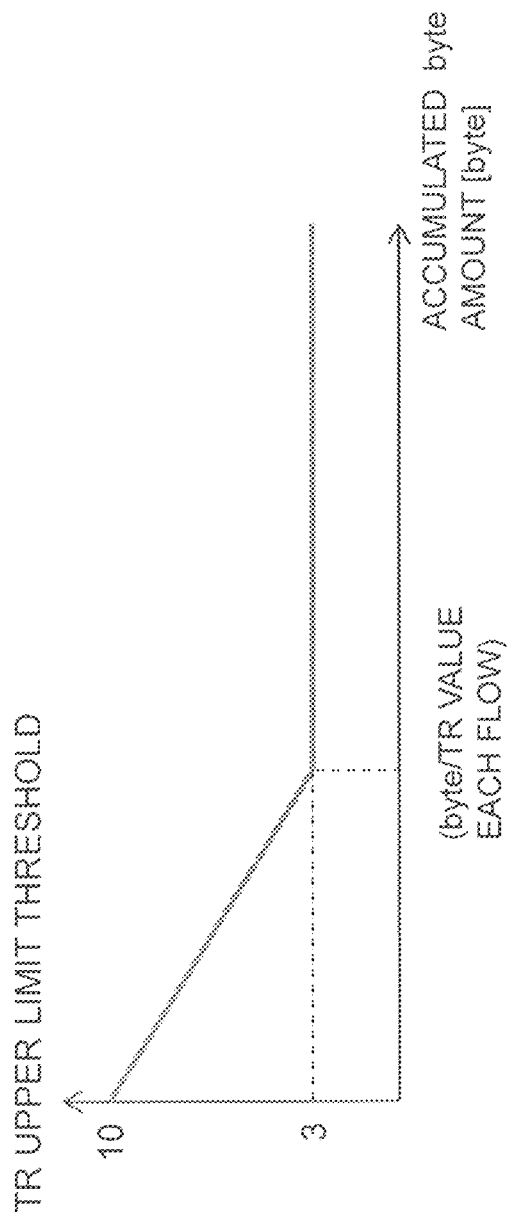
FIG. 16 illustrates an example of a function to decide the TR upper limit threshold using the quantity of accumulated bytes and a permissible band.

FIG. 16 illustrates an example of a function to decide the TR upper limit threshold using the quantity of accumulated bytes and the permissible band. In this case, the determination section 24 decides the TR upper limit threshold in accordance with a function of [TR upper limit threshold=Max (3, 10−(the quantity of accumulated bytes) *7/(bytes/TR))] as illustrated in FIG. 16.

According to the configuration of the eighth aspect, it becomes possible to achieve fairness in consideration of permissible bands (byte/TR) in the same flow.

[Second Embodiment]

Next, a second embodiment will be described. The second embodiment has points in common with the first embodiment. Description of the common points will be omitted, and different points will be mainly described. The second embodiment is a specific embodiment using the first, third, fifth, seventh and eighth aspects described in the first embodiment.

Figure 17:
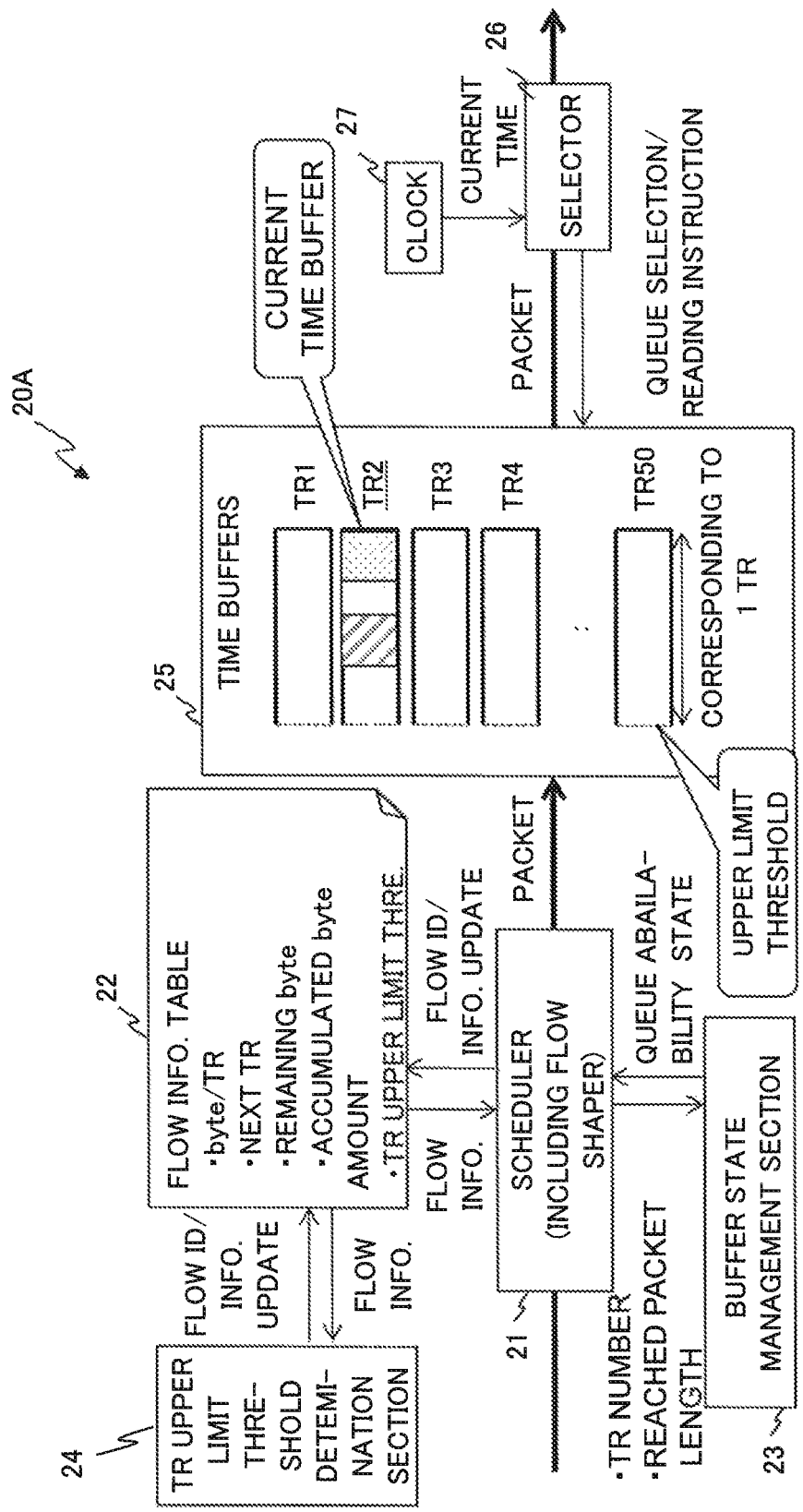
FIG. 17 illustrates a configuration example of an input-type scheduler according to a second embodiment.

FIG. 17 illustrates a configuration of an input-type scheduler according to the second embodiment. Since the configuration itself of an input-type scheduler 20A in FIG. 17 is almost the same as the input-type scheduler 20 (FIG. 10) in the first embodiment, description thereof will be omitted.

However, the input-type scheduler 20A is different from the input-type scheduler 20 of the first embodiment in the following points.

The output link band in the second embodiment is 100 Mbps. The number of time buffers is fifty. The selector 26 performs switching of time buffers basically every 1 ms. Therefore, the capacity of each time buffer is 12500 bytes (100 Mbits/1 ms=100 kbits=12500 bytes). In FIG. 17, it is assumed that the current time buffer is the time buffer TR2.

FIG. 18 illustrates storage content of a flow information table 22A in the second embodiment. FIG. 19 illustrates storage content of a buffer state table managed by a buffer state management section 23 in the second embodiment. It is assumed that, in the example illustrated in FIG. 19, there are m packet flows as BE-class packet flow passing through a scheduler 21.

The data structures themselves of the flow information table 22A and the buffer state management table in the second embodiment are the same as the flow information table 22 and the buffer state management table described in the first embodiment.

Figure 20:
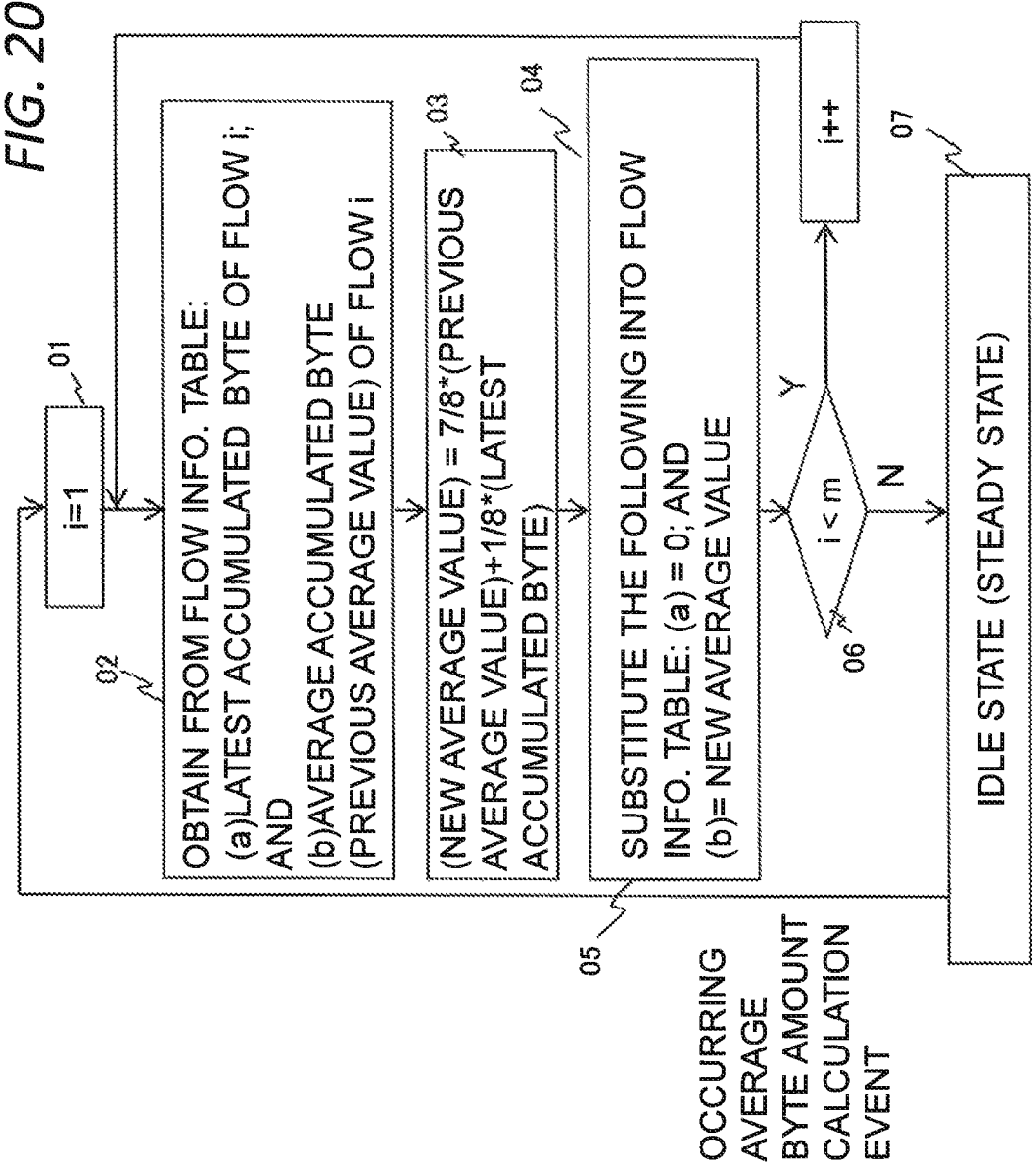
FIG. 20 is a flowchart illustrating a process for calculating the quantity of accumulated bytes in the second embodiment.

In the second embodiment, the third aspect described in the first embodiment is applied. Therefore, an average value is calculated as the quantity of accumulated bytes. FIG. 20 is a flowchart illustrating a process for calculating the quantity of accumulated bytes in the second embodiment. The scheduler 21 periodically performs the average value calculation illustrated in FIG. 20. The scheduler 21 calculates average values for all the (m) flows in one average value calculation event.

That is, for example, when an event of calculating an average quantity of accumulated bytes accompanying expiration of a timer occurs in an idle state (07), the scheduler 21 sets the value of an argument i indicating a flow to "1" indicating the first flow (flow #1) (01).

Next, the scheduler 21 acquires the latest accumulated bytes and the average accumulated bytes (used as a "previous average value") of the flow i from the flow information table 22 (02). Next, the scheduler 21 calculates a new average value using the latest accumulated bytes and the average accumulated bytes (03). A variety of methods exist as a method for deriving an applicable average value. For example, an average value derivation method by a moving average method illustrated in 03 of FIG. 20 can be applied.

In the case of the flow #1, the latest accumulated bytes is 3900, and the average accumulated bytes is 2852. Therefore, a value 2983 is derived as the new average value by calculation by the moving average method, ((⅛)*3900+(⅞)*2852).

When the new average value is calculated, the scheduler 21 overwrites the new average value on the average accumulated bytes of the flow i and resets the latest accumulated bytes (to 0) (04). After that, the scheduler 21 judges whether the value of the argument i has reached the number of flows m (05). When the value of i has not reached m (05, Y), the scheduler 21 increments the value of i (06) and returns the process to 02. In this way, the average value calculation is performed for the remaining flows #2 to #m. Then, when the value of i reaches m (05, N), and the process is completed for all the flows, the process returns to the idle state (07).

Figure 21:
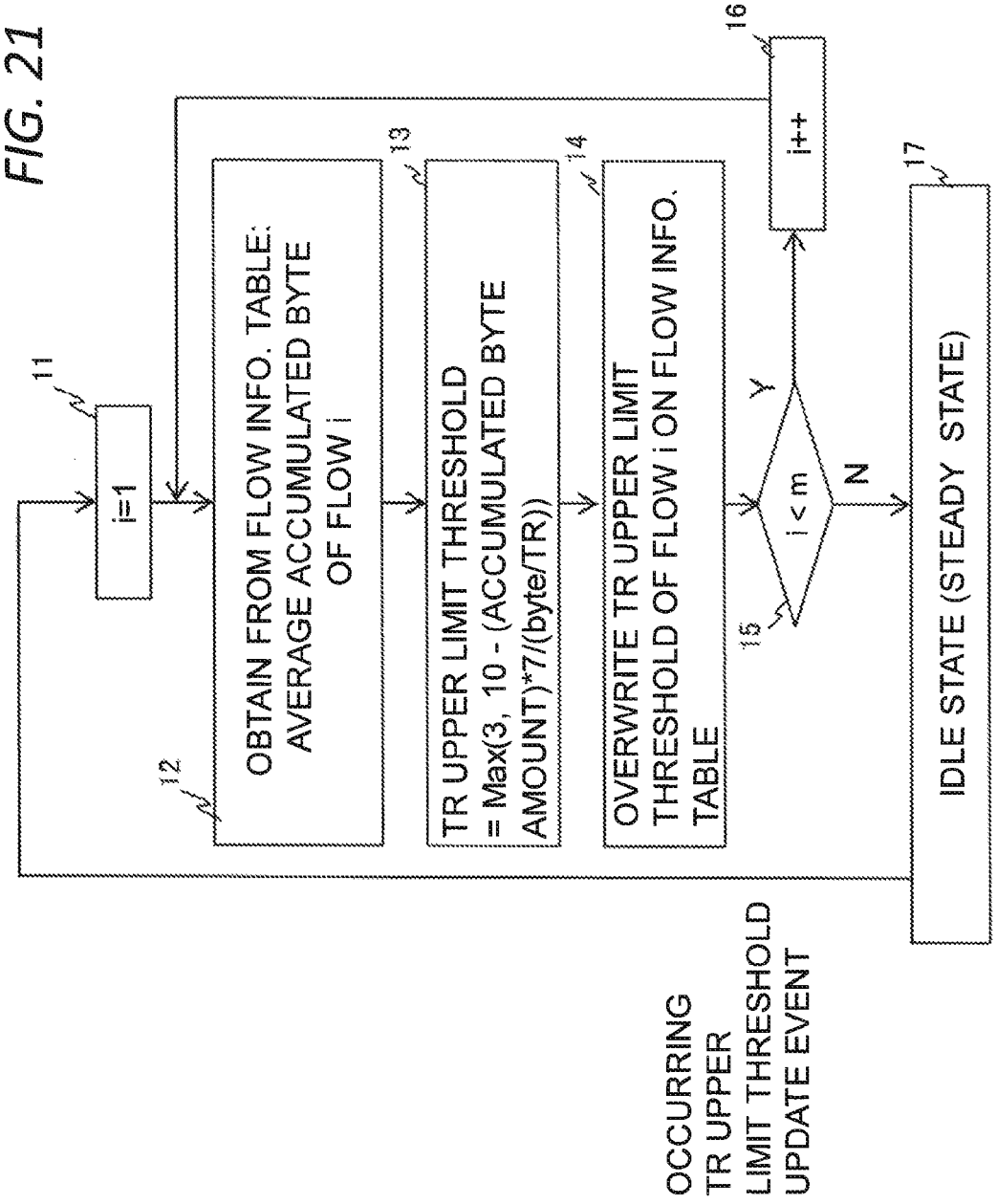
FIG. 21 is a flowchart illustrating an example of a process for calculating a TR upper limit threshold in the second embodiment.

FIG. 21 is a flowchart illustrating an example of a process for calculating a TR upper limit threshold in the second embodiment. The TR upper limit threshold calculation is also periodically executed, and average calculations for all the flows (m flows) are performed in one calculation event.

When a TR upper limit threshold update event occurs, the determination section 24 sets the argument i to 1 (11) and starts a process from the flow #1. The determination section 24 acquires the average accumulated bytes of the flow i from the flow information table 22 (12).

Next, the determination section 24 derives a TR upper limit threshold by substituting the average accumulated bytes into a calculation expression (13). In the second embodiment, the function illustrated in FIG. 16 is used. For example, the TR upper limit threshold of the flow #1 is: TR upper limit threshold=Max(3, 10−(2852*7/2500))=3. When the current time buffer is the time buffer TR2, buffering of packets corresponding to bytes/TR up to the time buffer TR5 is possible for the flow #1.

Next, the determination section 24 overwrites the TR upper limit threshold of the flow i on the flow information table 22 (14). After that, the determination section 24 judges whether the value of the argument i has reached the number of flows m or not (15). When the value of i has not reached m (15, Y), the scheduler 21 increments the value of i (16) and returns the process to 12. In this way, the average value calculation is performed for the remaining flows #2 to #m. Then, when the value of i reaches m (15, N) and the process is completed for all the flows, the process returns to the idle state (17).

In the above process, the TR upper limit threshold=Max (3, 10−(2908*7/7500))≈7.3 is obtained for the flow #2. When the current time buffer is the time buffer TR2, packets corresponding to bytes/TR (7500 [bytes]) can be unconditionally accumulated up to the time buffer TR9. Furthermore, 7000 [bytes]*0.3=2250 [bytes] can be accumulated in a time buffer.

In the case where the function in FIG. 16 (the eighth aspect) is applied, it is considered to be fair that the bytes/TR ratio is satisfied. Therefore, there may happen a case where the flow #2 with a high value of the average accumulated bytes is preferentially treated like the example of the flows #1 and #2 described above.

<Process at the Time of Arrival of Packet>

Figure 22:
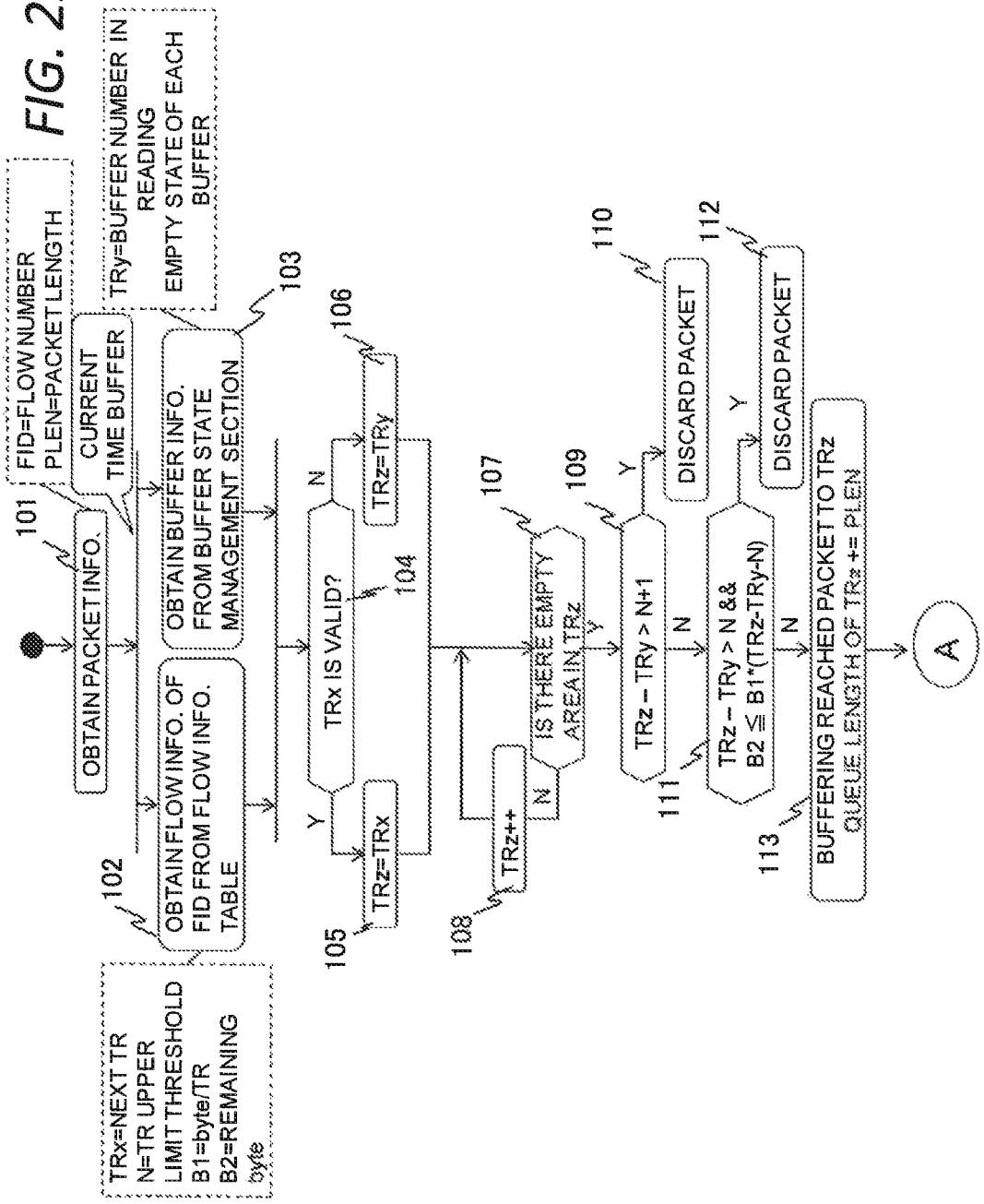
FIG. 22 is a flowchart illustrating an example of a process of the scheduler at the time of arrival of a packet in the second embodiment.
Figure 23:
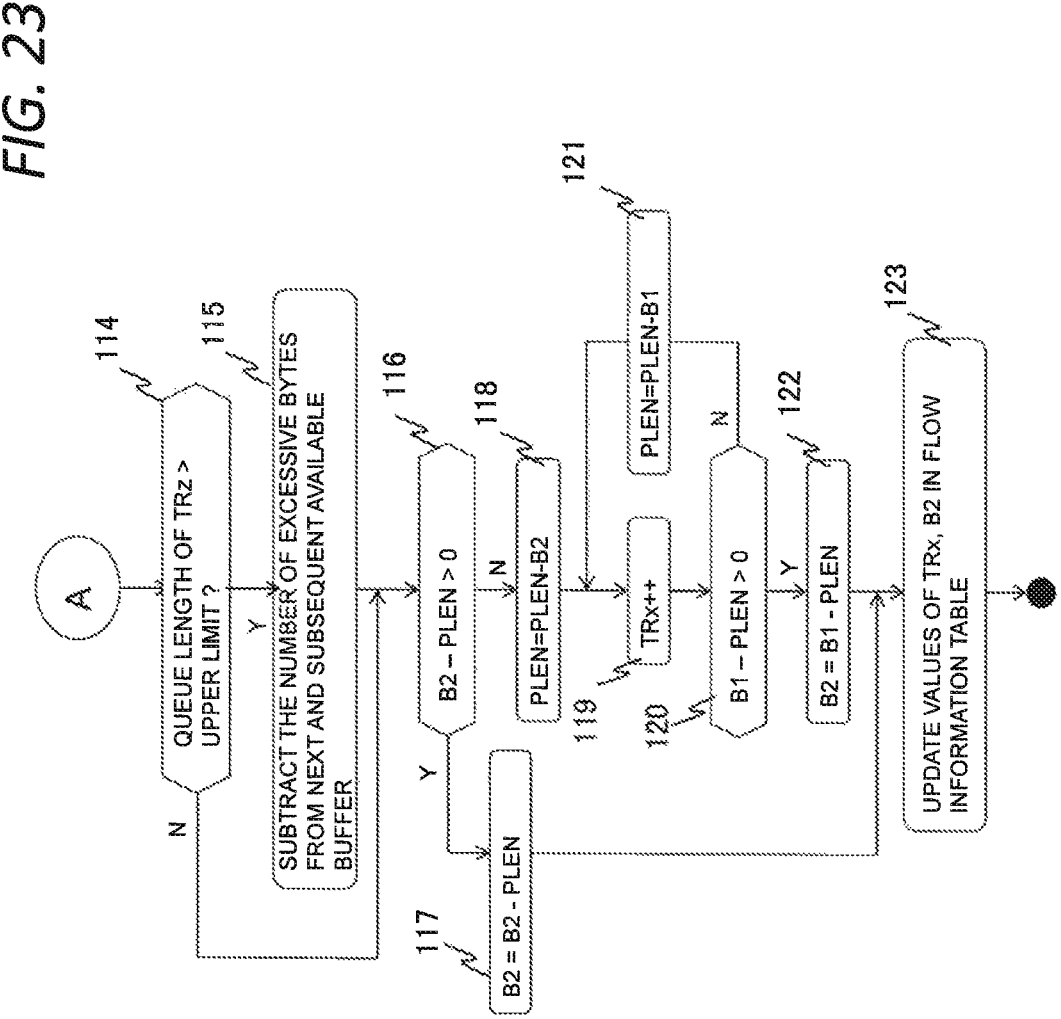
FIG. 23 is a flowchart illustrating an example of the process of the scheduler at the time of arrival of a packet in the second embodiment.

FIGS. 22 and 23 are flowcharts illustrating an example of a process of the scheduler 21 at the time of arrival of a packet in the second embodiment. At 101 at the beginning, the scheduler 21 obtains, from the arrived packet, the flow number (flow identifier: FID) and packet length (PLEN) of the packet.

At 102, the scheduler 21 accesses the flow information table and obtains flow information corresponding to the FID. The flow information includes "TRx", a value indicating the next TR, "N", a value indicating the TR upper limit threshold, "B1", a value indicating time buffer capacity "bytes/TR", and "B2", a value indicating remaining bytes.

The scheduler 21 also obtains buffer information from the buffer state management section at 103. The buffer information includes "TRy", a value indicating the identifier (time buffer number) of a time buffer being read currently (current time buffer), and information indicating availability of each time buffer. The information indicating availability of each time buffer indicates at least whether the amount of data accumulated in the time buffer has reached a queue upper limit threshold or not.

Next, the scheduler 21 judges whether the value of "TRx" is valid or not in order to decide a time buffer into which a packet is to be stored (104). Here, when "TRx" is specified for a packet of the flow of the buffer which has arrived in the past, the value of "TRx" is valid. In contrast, when the packet is the first packet (when there is no packet which arrived in the past), and when the value of "TRx" indicates a time in the past before the time of the current buffer, the value of "TRx" is invalid.

When the value of TRx is valid (104, Y), the scheduler 21 decides a time buffer identified by the value of TRx to be a buffering candidate (105). In contrast, when the value of TRx is invalid (104, N), the scheduler 21 decides a current time buffer identified by the value of "TRy" to be a buffering candidate (106).

Next, the scheduler 21 checks whether the packet can be buffered into the buffering candidate time buffer or not. That is, the scheduler 21 judges whether a time buffer of TRz is available or not, using information indicating availability of each buffer (107).

When the time buffer of TRz is not available (107, N), the value of TRz is incremented (108) and availability of the next time buffer (TRz+1) is checked (107). The loop of 107 and 108 is repeated until an available time buffer is found. When an available time buffer is found, the scheduler 21 decides the time buffer as a new buffering candidate (TRz).

When the time buffer of TRz is available (107, Y), the process proceeds to 109. At 109, the scheduler 21 judges whether or not difference between the buffering candidate TRz and the current time buffer TRy is within the TR upper limit threshold N of the flow (TRz−TRy>N+1).

That is, the value of (TRz−TRy) is larger than the value of (N+1) (109, Y), the scheduler 21 discards the packet (110). This is because the time buffer identified by TRz is a time buffer beyond permission of buffering.

In contrast, when the value of (TRz−TRy) is larger than N and is (N+1) or smaller (N+1≥TRz−TRy>N) (109, N), the process proceeds to 111. That is, when N is a value with decimal places, and TRz is a time buffer targeted by judgment of the value with decimal places (109, N), the scheduler 21 further performs judgment using remaining bytes (B2) (110).

At 110, when the value of B2 is larger than permissible accumulated bytes (B1*(TRz−TRy−N)) (111, N), the scheduler 21 advances the process to 113. If not (111, Y), the scheduler 21 discards the packet (112). In the case where (TRz−TRy≤N) is satisfied also, the process proceeds to 113.

At 113, the scheduler 21 stores the packet into a time buffer identified by the value of TRz. At this time, the scheduler 21 adds the packet length "PLEN" to the queue length (the amount of data accumulation) of the time buffer identified by the value of TRz in order to update the buffer state management table (FIG. 19).

Next, the scheduler 21 judges whether the queue length after the addition exceeds the queue upper limit threshold or not (114). When the queue length exceeds the queue upper limit threshold then (114, Y), the scheduler 21 subtracts the excessive number of bytes from available areas of the next and subsequent time buffers (115) and advances the process to 111. In contrast, when the queue length does not exceed the queue upper limit threshold (114, N), the process proceeds to 116.

The above process up to 115 is a process related to packet buffering. When the process ends, the flow information table is updated in a process at and after 116.

At 116, the scheduler 21 judges whether a value obtained by subtracting the packet length "PLEN" from the value of the remaining bytes "B2" is larger than 0 or not. The value of B2 indicates the number of remaining available bytes of the next time buffer TRx. Therefore, when the packet length (PLEN) of the packet which has arrived this time is smaller than the value of B2 (B2−PLEN>0: 116, Y), the value obtained by subtracting PLEN from the value of B2 is decided as a new value of B2 (117). The value of TRx is not changed then.

When the packet length is larger than the remaining bytes (B2−PLEN≤0: 116, N), however, the scheduler 21 obtains a new value of PLEN by subtracting B2 from the value of PLEN (118). Furthermore, the scheduler 21 increments TRx (adds 1 to the value of TRx) (119).

Next, the scheduler 21 judges whether a value obtained by subtracting the value of PLEN from the value of B1 indicating the number of bytes which can be accumulated in the next time buffer is larger than 0 (a positive number) or not (120). When a positive value is not obtained then (120, N), the scheduler 21 decides a value obtained by subtracting the value of B1 from the value of PLEN to be a new value of PLEN (121). Furthermore, the scheduler 21 increments the value of TRx (119) and returns the process to 120. The scheduler 21 repeats the loop of 121 and 191 until the value of (B1 −PLEN) becomes positive.

When the value of (B1−PLEN) becomes positive, the scheduler 21 decides the value of "B1−PLEN" then as a new value of B2 (122). Then, the scheduler 21 writes back the values of TRx and B2 into the flow information table. Thereby, the flow information about the flow of the arrived packet is updated.

As for the operation and advantages of the second embodiment, advantages similar to the advantages obtained by the corresponding aspects described in the first embodiment can be obtained. The configurations described in the first and second embodiments can be appropriately combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention

What is claimed is:

1. A traffic control apparatus at which packets of a plurality of packet flows arrive, comprising:
a plurality of buffers corresponding to a plurality of times;
a selector configured to read a packet accumulated in one of the plurality of buffers corresponding to a current time; and
a scheduler configured to decide at least one of the plurality of buffers to accumulate a packet of each of the plurality of packet flows,
wherein the scheduler is configured to obtain quantity of first packets being packets of one of the plurality of packet flows accumulated in a first buffer within the plurality of buffers during a predetermined period, and is configured to decide one or more buffers as second buffers differing from the first buffer among the plurality of buffers, wherein the second buffers are available to accumulate second packets being packets of the one of the plurality of packet flows arriving during a next predetermined period, and wherein the scheduler is configured to decrease the number of second buffers as the quantity of first packets increases, and at least a part of the second packets is discarded when there is no space in the second buffers.

2. The traffic control apparatus according to claim 1, wherein the scheduler attempts accumulation of packets in accordance with an upper limit threshold of buffers accumulating packets in a future direction from a buffer corresponding to a current time, wherein the upper limit threshold is decided according to the quantity of packets.

3. The traffic control apparatus according to claim 2, further comprising:
a storage device configured to store the quantity of packets corresponding to each of the plurality of packet flows; and
a determination section configured to decide an upper limit threshold to be applied to each of the plurality of packet flows in accordance with the quantity of packets of each of the plurality of packet flows stored in the storage device and correspondence relationships between quantities of packets and upper limit thresholds and configured to store the decided upper limit threshold into the storage device.

4. The traffic control apparatus according to claim 2, further comprising:
a storage device configured to store the quantity of packets corresponding to each of the plurality of packet flows; and
a determination section configured to decide an upper limit threshold to be applied to each of the plurality of packet flows in accordance with the quantity of packets of each of the plurality of packet flows stored in the storage device and a function to determine an upper limit threshold corresponding to the quantity of packets and configured to store the decided upper limit threshold into the storage device.

5. The traffic control apparatus according to claim 2, further comprising:
a storage device configured to store the quantity of packets corresponding to each of the plurality of packet flows and a permissible quantity of packets of each packet flow that can be accumulated in a single buffer; and
a determination section configured to decide an upper limit threshold to be applied to each of the plurality of packet flows in accordance with the quantity of packets and the permissible quantity of each of the plurality of packet flows stored in the storage device and correspondence relationships between the quantities of packets and the permissible quantities, and upper limit thresholds and configured to store the decided upper limit threshold into the storage device.

6. The traffic control apparatus according to claim 2, further comprising:
a storage device configured to store the quantity of packets corresponding to each of the plurality of packet flows and a permissible quantity of packets of each of the plurality of packet flows that can be accumulated in a single buffer; and
a determination section configured to decide an upper limit threshold to be applied to each of the plurality of packet flows in accordance with the quantity of packets and the permissible quantity of each of the plurality of packet flows stored in the storage device and a function to determine an upper limit threshold corresponding to the quantity of packets and the permissible quantity and configured to store the decided upper limit threshold into the storage device.

7. The traffic control apparatus according to claim 2, wherein:
the quantity of packets stored in a storage device is reset for each lapse of the predetermined period; and
the determination section is configured to decide the upper limit threshold using the quantity of packets accumulated during a period until the predetermined period elapses after the last reset.

8. The traffic control apparatus according to claim 2, wherein:
the quantity of packets stored in a storage device is reset for each lapse of the predetermined period; and
the determination section is configured to decide the upper limit threshold using an average value of the quantity of packets for the predetermined period.

9. The traffic control apparatus according to claim 2, wherein the determination section is configured to decide the upper limit threshold for each buffer.

10. The traffic control apparatus according to claim 2, wherein the determination section is configured to decide the upper limit threshold for each amount that can be accumulated.

11. A buffering control method of a traffic control apparatus at which packets of a plurality of packet flows arrive, the traffic control apparatus including a plurality of buffers corresponding to a plurality of times, a selector configured to read a packet accumulated in one of the plurality of buffers corresponding to a current time, and a scheduler configured to decide at least one of the plurality of buffers to accumulate a packet of each of the plurality of packet flows, the method comprising:
obtaining, by using the scheduler, quantity of first packets being packets of one of the plurality of packet flows accumulated in a first buffer within the plurality of buffers during a predetermined period;
deciding, by using the scheduler, one or more buffers as second buffers differing from the first buffer among the plurality of buffers, wherein the second buffers are available to accumulate second packets being packets of the one of the plurality of packet flows arriving during a next predetermined period;
decreasing, by using the scheduler, the number of second buffers as the quantity of first packets increases; and
discarding at least a part of the second packets when there is no space in the second buffers.

12. A packet relay apparatus, comprising:
a traffic control apparatus at which packets of a plurality of packet flows arrive, including:
a plurality of buffers corresponding to a plurality of times;
a selector configured to read a packet accumulated in one of the plurality of buffers corresponding to a current time; and
a scheduler configured to decide at least one of the plurality of buffers to accumulate a packet of each of the plurality of packet flows,
wherein the scheduler is configured to obtain quantity of first packets being packets of one of the plurality of packet flows accumulated in a first buffer within the plurality of buffers during a predetermined period, and is configured to decide one or more buffers as second buffers differing from the first buffer among the plurality of buffers, wherein the second buffers are available to accumulate second packets being packets of the one of the plurality of packet flows arriving during a next predetermined period, and wherein the scheduler is configured to decrease the number of second buffers as the quantity of first packets increases, and at least a part of the second packets is discarded when there is no space in the second buffers.

* * * * *